(12) United States Patent
Kokura

(10) Patent No.: US 6,901,323 B2
(45) Date of Patent: May 31, 2005

(54) CARGO HANDLING VEHICLE

(75) Inventor: Kazumasa Kokura, Osaka (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 127 days.

(21) Appl. No.: 09/993,511

(22) Filed: Nov. 27, 2001

(65) Prior Publication Data

US 2002/0069005 A1 Jun. 6, 2002

(30) Foreign Application Priority Data

Nov. 28, 2000 (JP) .................................. P 2000-361481
Nov. 28, 2000 (JP) .................................. P 2000-361482

(51) Int. Cl.$^7$ ............................ G06F 19/00; B66F 9/06
(52) U.S. Cl. ..................... 701/50; 187/222; 187/237; 414/539
(58) Field of Search .............................. 701/1, 36, 50; 187/222, 225–226, 233, 237–238, 22; 414/540–543, 567, 462, 538, 459, 510; 180/210, 211, 411; 280/98; 198/350, 316.1

(56) References Cited

U.S. PATENT DOCUMENTS 3,856,102 A    12/1974   Queen
4,551,059 A  * 11/1985   Petoia ........................ 414/459
4,926,958 A  *  5/1990   Nishikawa et al. ......... 180/168
5,238,077 A     8/1993   Vaughn et al.
5,325,935 A  *  7/1994   Hirooka et al. ............. 180/211

FOREIGN PATENT DOCUMENTS

| DE | 43 34 279 A1 | 4/1995 |
| EP | 0 625 478 A1 | 11/1994 |
| EP | 0 712 805 A2 | 5/1996 |
| JP | 5-92769 | 4/1993 |
| JP | 5-116643 | 5/1993 |
| JP | 8-113156 | 5/1996 |
| JP | 10-244953 | 9/1998 |
| JP | 11-115792 | 4/1999 |
| WO | WO 00/68134 A1 | 11/2000 |
| WO | WO 00/76902 A1 | 12/2000 |

OTHER PUBLICATIONS

Japanese Abstract No. 8091790, dated Apr. 9, 1996.
Japanese Abstract No. 11115792, dated Apr. 27, 1999.

* cited by examiner

Primary Examiner—Jacques H. Louis-Jacques
(74) Attorney, Agent, or Firm—Sughrue Mion, PLLC

(57) ABSTRACT

Separately from a normal running mode, there is provided a turning mode in which a body (1) is allowed to turn. In the turning mode, road wheels (5a, 5b) and a driving wheel (8) are set such that the wheels are oriented so as to follow along a circumference R1 to R3 that would be formed about a distal end (B) of a fork arm (2b). As a result of this, the body (1) is allowed to turn about the distal end (B) of the fork arm (2b), whereby the body (1) can simply be positioned so as to confront the front of a pallet (40).

18 Claims, 25 Drawing Sheets

CARGO HANDLING VEHICLE

BACKGROUND OF THE INVENTION

1. Field of the Invention

The present invention relates a cargo handling vehicle such as a forklift truck, and more particularly to a cargo handling vehicle which can turn a body thereof.

2. Description of the Related Art

A forklift truck is a cargo handling vehicle for carrying cargo placed on fork arms provided at the front of a body of the vehicle and the body can change its traveling direction or raise and/or lower the fork arms when an operator operates a steering wheel or associated levers. In a case where a forklift truck such as this is used to unload cargo, when cargo is loaded on a pallet, distal ends of the fork arms are inserted into insertion openings in the pallet so that the cargo is lifted together with the pallet and the pallet and cargo are transported to a target place, where the cargo is unloaded from the pallet. The empty pallet from which the cargo has been unloaded is then transported by the forklift truck to a predetermined place where the pallet so transported is then stacked on pallets which are stacked at the place for storage.

FIGS. 31A and 31B are diagrams showing a situation in which an empty pallet is transported by a forklift truck for stacking, and the forklift truck 100 and the pallets 40a, 40b are viewed from the top in the diagram. In the figure, reference numeral 1 denotes a body of the forklift truck 100, reference numerals 2a, 2b fork arms, respectively, provided left and right at the front of the body 1, reference numeral 3 a mast along which the fork arms 2a, 2b are raised and/or lowered, reference numeral 40a the pallet stacked at a predetermined place, and reference numeral 40b the pallet carried by the fork arms 2a, 2b of the forklift truck 100. FIG. 32 is a perspective view of the pallet 40a, 40b (represented by reference numeral 40), and the pallet 40 is constructed by assembling wood plates 42, and insertion holes 41 are formed between end beams 421 and a central beam 422, respectively, for insertion of the fork arms 2a, 2b thereinto.

With the forklift truck 100 being now positioned as shown in FIG. 31A relative to the stacked pallet 40a, in order to place the pallet 40b carried by the fork arms 2a, 2b on the stacked pallet 40a in such a manner as to align with each other, the forklift truck 100 is then moved to a position where the pallet 40b overlaps the pallet 40a as shown in FIG. 31. Band thereafter the pallet 40b is place on the pallet 40a in an overlapped fashion.

However, in order to move the forklift truck 100 from the position shown in FIG. 31A to the position shown in FIG. 31B, the orientation of the body 1 has to be changed by manipulating the steering wheel and levers and the body 1 also has to be moved transversely and longitudinally. This makes it difficult for beginners to move the body to a desired position smoothly, and in particular in a case where the fork arms 2a, 2b are positioned close to the pallet 40a, the operations need to be repeated several times, and therefore, lots of time has to be spent unloading cargo. In addition, there is imposed a limitation to a range where the body 1 can be moved in a narrow space, and therefore, the implementation of theforesaid operations becomes more inefficient.

SUMMARY OF THE INVENTION

The present invention was made to solve the problems and an object thereof is to provide a cargo handling vehicle which allows even beginners to perform the unloading operations efficiently and simply.

With a view to solving the problems, according to the invention, in addition to a normal running mode, there is provided a turning mode in which a body of a forklift truck is turned, and the modes are designed to be switched over using a a mode switching section. Then, in the turning mode, the body is designed to be turned about the vicinity of a distal end of a cargo carrier table. According to the construction, since the body is turned about the vicinity of the distal end of the cargo carrier table, the body can easily be positioned in front of the cargo or pallet, thereby making it possible to reduce the time required for the unloading operations.

Various forms can be taken as the center of turn of the body. In a case where the cargo carrier table is provided left and right at the front of the body, a distal end of either of the cargo carrier tables can be the center of turn. In addition, a central portion of a line connecting distal ends of the respective cargo carrier tables may be set as the center of turn. Alternatively, a position frontward a predetermined distance from the distal ends of the respective cargo carrier tables can be made as the center of turn.

Furthermore, according to the invention, a a center-of-turn selecting section may be provided for selecting a desired center of turn from a plurality of centers of turn. In this case, a wheel may be set at a predetermined angle by operating a steering wheel when a center of turn is selected so that the body is turned about the center of turn so selected. The wheel may automatically be set at the predetermined angle instead of operating the steering wheel.

Moreover, instead of providing the center-of-turn selecting section, it may be constructed such that the distal end of the left cargo carrier table is set as a center of turn when the steering wheel is turned counterclockwise in the turning mode, whereas the distal end of the right cargo carrier table is set as a center of turn when the steering wheel is turned clockwise.

In addition, in a cargo handling vehicle such as a reach forklift truck in which the cargo carrier tables are provided in such a manner as to freely move in longitudinal directions of the body thereof, since the center of turn needs to be changed depending upon the position of the cargo carrier tables, there is provided a a position detecting section for detecting a position to which the cargo carrier tables are moved relative to the body so that a center of turn of the body may be calculated based on the position of the cargo carrier tables detected by the position detecting section.

Furthermore, according to the invention, the mode of the cargo handling vehicle is switched over from the turning mode to the normal running mode when the turn of the body is completed and the body is prohibited from running until the wheels are restored to a condition in which the body is allowed to move straight. This construction can prevent the body from starting in an unexpected direction. As this occurs, there may be provided an an information section for informing that the body is ready to run when the condition is restored in which the body is allowed to move straight.

According to another aspect of the invention, in addition to a normal running mode, there is provided a turning mode in which a body of a forklift truck is turned, and the modes are designed to be switched over using a a mode switching section. Then, in the turning mode, the body is designed to be turned about substantially a longitudinally and transversely central portion of cargo carrier tables for carrying cargo. According to the construction, since the body is turned about substantially a central portion of the pallet carried by the cargo carrier tables, the pallet carried by the cargo carrier tables can easily be stacked on stacked pallets in such a manner as to align therewith, thereby making it possible to reduce the time required for the stacking operations.

In order for the body to turn as the center of turn about substantially the longitudinally and transversely central portion of the cargo carrier tables as described above, a wheel provided on the body needs to be set at a predetermined angle, and this setting may be manually performed by operating a steering wheel. Instead of operating the steering wheel, the wheel may automatically be set at the predetermined angle.

In addition, in a cargo handling carrier like a reach forklift truck in which cargo carrier tables are provided in such a manner as to freely move in longitudinal directions of the body, since the center of turn needs to be changed depending upon the position of the cargo carrier tables, there is provided a a position detecting section for detecting a position to which the cargo carrier tables are moved relative to the body, and a center of turn for the body may be calculated based the position of the cargo carrier tables detected by the position detecting section.

Furthermore, according to the invention, the operation mode is switched over from the turning mode back to the running mode after the turn of the body has been completed, and the body is prohibited from running until the wheel is returned to a state in which the body gets ready to move straight. According to the construction, the body is prevented from starting to run in an unexpected direction. As this occurs, there may be provided an an information section for informing that the body is ready to run when the body has put in the state in which the body is ready to move straight.

In addition, according to the invention, a center of turn may be selected out of a plurality of centers of turn, so that the body turns as the center of turn about the center of turn so selected. As this occurs, the center of turn may be set depending upon types of operations such as cargo unloading and pallet stacking operations.

DETAILED DESCRIPTION OF THE PRESENT INVENTION

The present invention will be described with reference to the accompanying drawings.

It should be noted that reach forklifts, showed in the following embodiments, has wheels being independently steerable, for example which is shown in U.S. Pat. No. 5,325,935, EP0625478 or EP0712805.

First Embodiment

Figure 1:
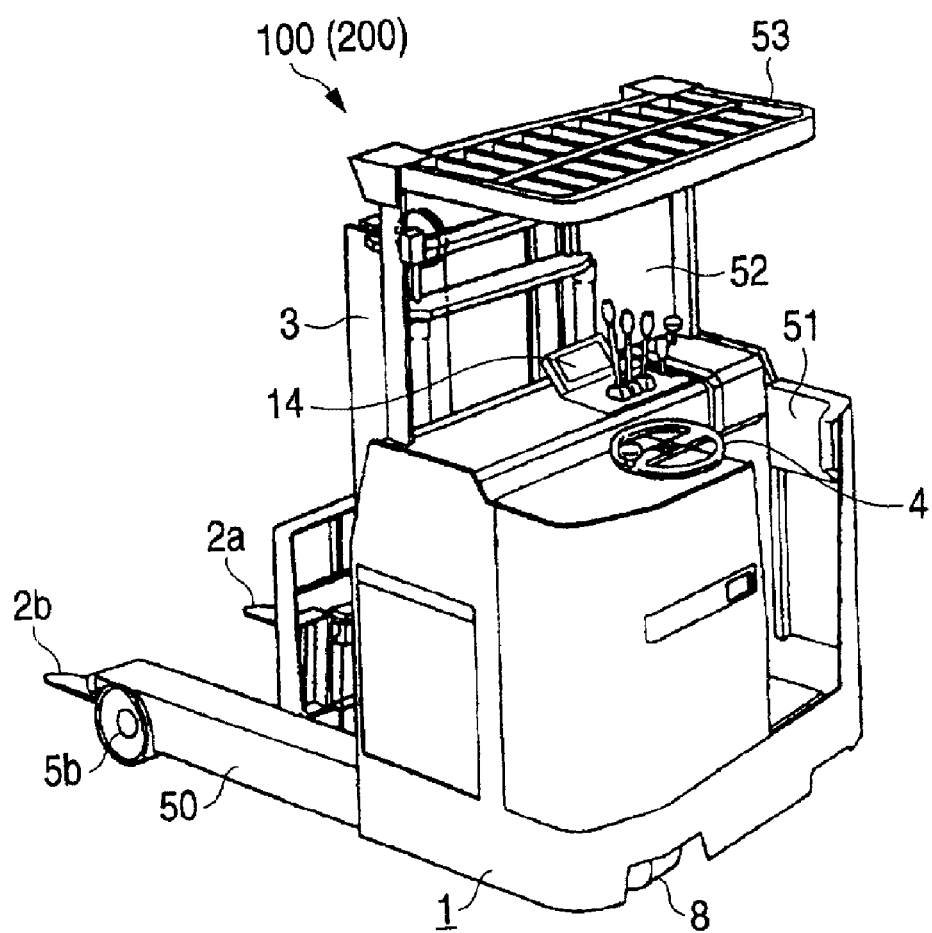
FIG. 1 is a perspective view of a reach forklift truck according to one embodiment of the invention.

FIG. 1 shows a reach forklift truck which is one embodiment of the invention. In the figure, reference numeral 100 denotes a reach forklift truck (hereinafter, referred to simply as a forklift truck) as a cargo handling vehicle, 1 a body of the forklift truck 100, 2a, 2b fork arms provided left and right at the front of the body 1 as cargo carrier tables, 3 a mast for raising and/or lowering the fork arms 2a, 2b, and 4 a steering wheel for changing the traveling direction of the body 1. Reference numeral 50 denotes a straddle arm constituting a part of the body 1, 51 an operator's seat where the operator (or the driver) can operate the vehicle while standing thereat, 52 operation levers used to run the body 1 and/or raise and/or lower the fork arms 2a, 2b, and 53 a head guard provided above the operator's seat 51 for protecting the operator against falling matters. Reference numeral 5b denotes a road wheel provided at the front of the body, 8 a driving wheel provided at the rear of the body, and 14 a display panel provided at the front of the operator's seat 51.

Figure 2:
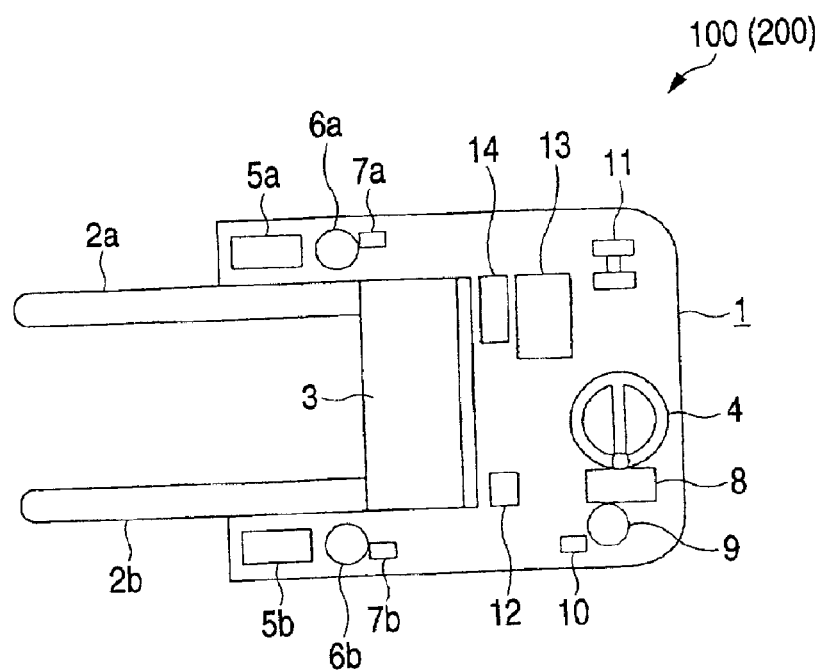
FIG. 2 is a plan view illustrating the constitution of a main part of the forklift truck.

FIG. 2 is a diagram showing the construction of a main part of the forklift truck 100 as a plan view. In the figure, like reference numerals are given to portions like to those shown in FIG. 1. A pair of road wheels 5a, 5b are provided at the front of the body and steering motors 6a, 6b are provided for turning the road wheels, respectively. In addition, angle sensors 7a, 7b are provided for the steering motors for detecting the turning angle of the road wheels, respectively. Reference numeral 9 denotes a steering motor adapted to interlock with the operation of the steering wheel 4 for rotation to assist the driving wheel 8 in turning, 10 an angle sensor for detecting the turning angle of the driving wheel 8. Reference numeral 11 denotes a caster wheel adapted to turn freely in every direction. Reference numeral 12 denotes a potentiometer as a a position detecting section for detecting the position of fork arms 2a, 2b, 13 a controller for controlling the respective parts and 14 the display panel which has been described previously.

Figure 3:
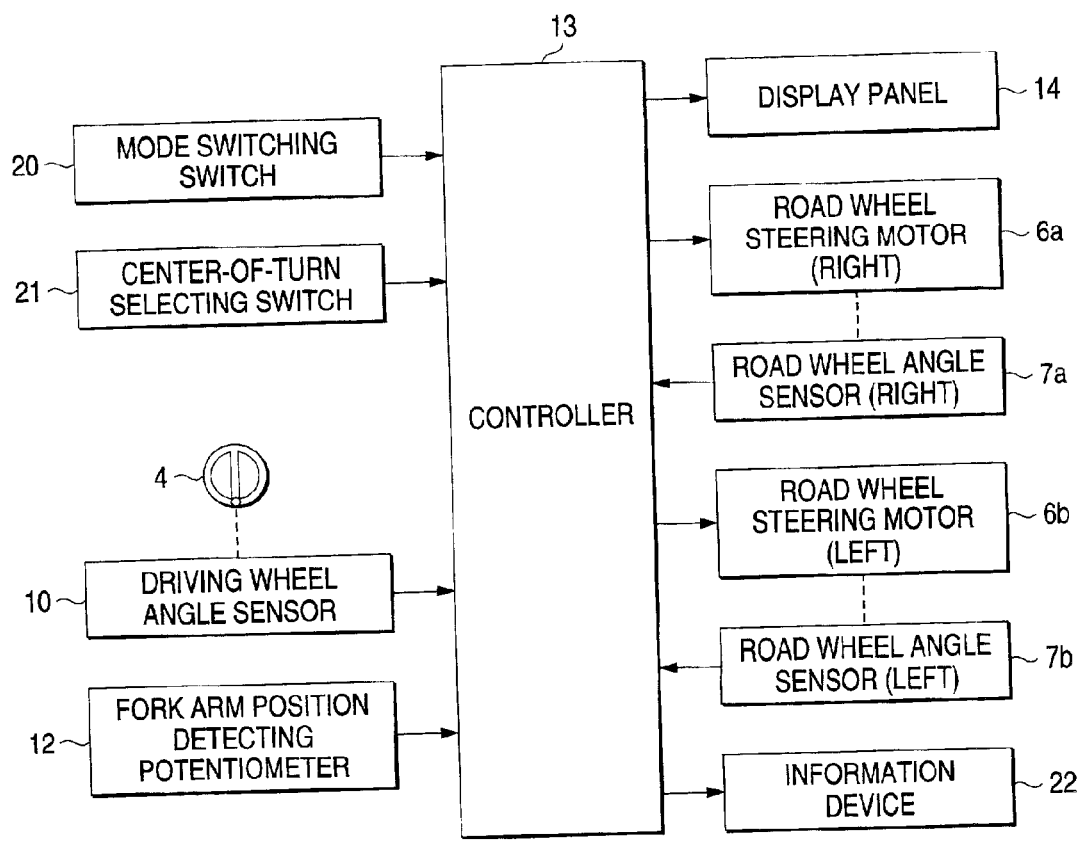
FIG. 3 is a block diagram showing the electrical configuration of the forklift truck.

FIG. 3 is a block diagram showing the electrical configuration of the aforesaid forklift truck 100, and like reference numerals are imparted to portions like to those described with reference to FIG. 2. Shown in the figure are blocks only which are related to the invention, and the steering motor 9 and the angle sensor 10 for the driving wheel 8, the other motors, the operation levers, various switches and the like are therefore omitted. A mode switching switch 20 constitutes a a mode switching section according to the invention, a center-of-turn selecting switch 21 constitutes a a center-of-turn selecting section of the invention, and an information device 22 constitutes an an information section of the invention. In addition, the controller 13 constitutes a a center-of-turn position calculating section according to the invention.

Figure 4:
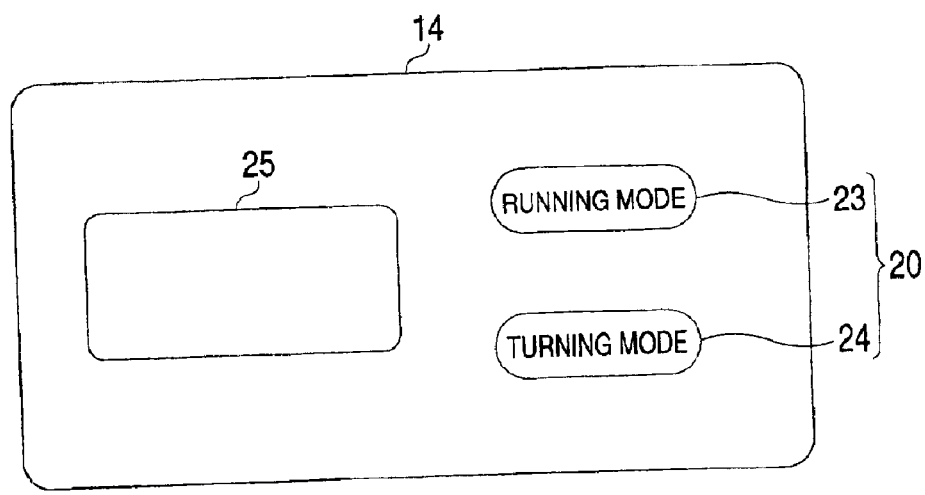
FIG. 4 is a diagram showing an example of an initial screen in a display panel.

FIG. 4 illustrates an example of an initial screen appearing on the display panel 14. Provided on the display panel 14 are a running mode switch 23 for selecting a normal running mode and a turning mode switch 24 for selecting a turning mode, and the mode switching switch 20 shown in FIG. 3 is constituted by these switches 23, 24. Reference numeral 25 denotes an information display part for displaying various types of pieces of information.

Figure 5:
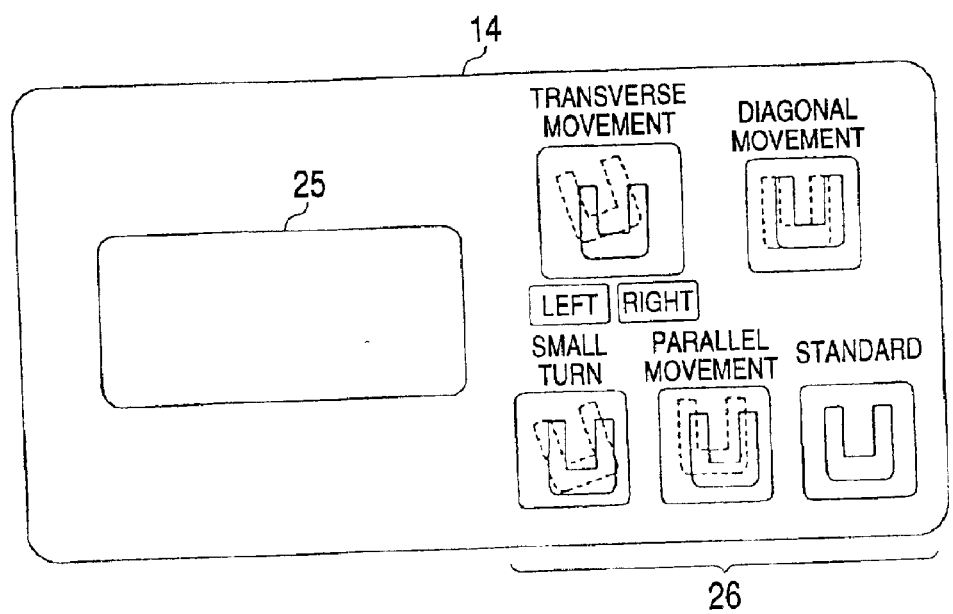
FIG. 5 is a diagram showing an example of a running mode screen.

In FIG. 4, when the running mode switch 23 is depressed, the screen of the display panel 14 is switched over to a running mode screen such as shown in FIG. 5. Displayed on this screen is a running direction selecting switch 26 for selecting a running direction for the forklift truck 100. When any of directions shown under the running direction selecting switch 26 is depressed, characters or symbols indicating an associated steering wheel operation are displayed in the information display part 25, but it is not the main part of the invention, and therefore the detailed description thereof is omitted here.

Figure 6:
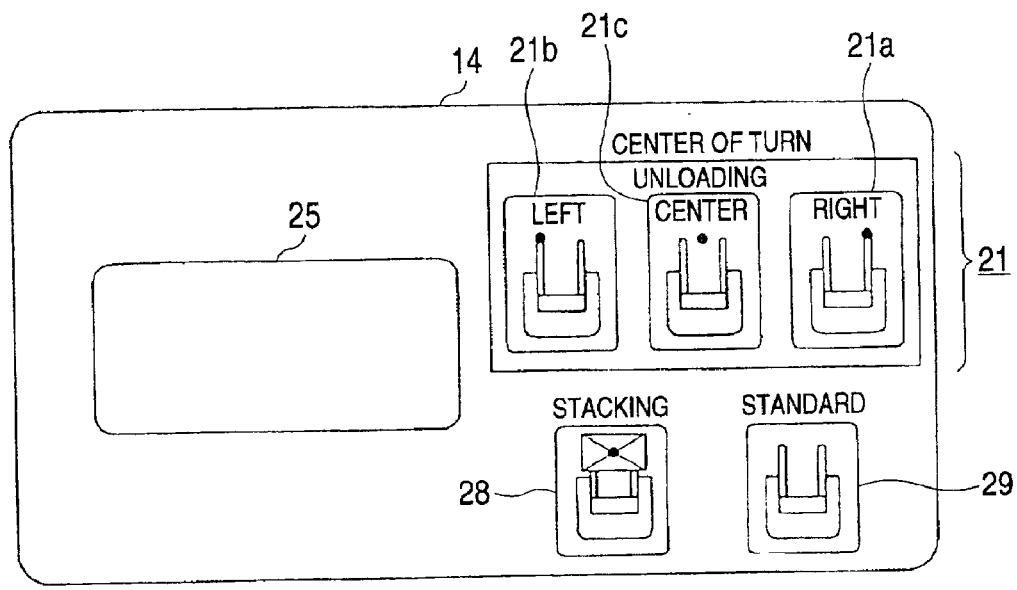
FIG. 6 is a diagram showing an example of a turning mode screen.

In FIG. 4, when the turning mode switch 24 is depressed, the screen of the display panel 14 is switched over to a turning mode screen such as shown in FIG. 6. Displayed on this screen is the center-of-turn selecting switch 21 shown in FIG. 3 is displayed, and the center of turn of the forklift truck 100 is selected using this switch when unloading cargo. Here, three positions such as "right," "left," and "center" can be selected as the center of turn of the forklift truck 100, and there are provided a total of three center-of-turn selecting switches 21a to 21c which correspond to those three positions, respectively. Reference numeral 28 denotes a switch for setting a center of turn for stacking pallets, and it is not a main part of the present invention, and therefore, the detailed description there of is omitted. Reference numeral 29 denotes a standard mode switch for switching the operation mode from the turning mode back to the normal running mode for preparing a condition (a standard mode) in which the vehicle is ready to move straight. This standard mode switch 29 constitutes the mode switching switch of the invention together with the switches 23, 24 shown in FIG. 4.

Figure 10A:
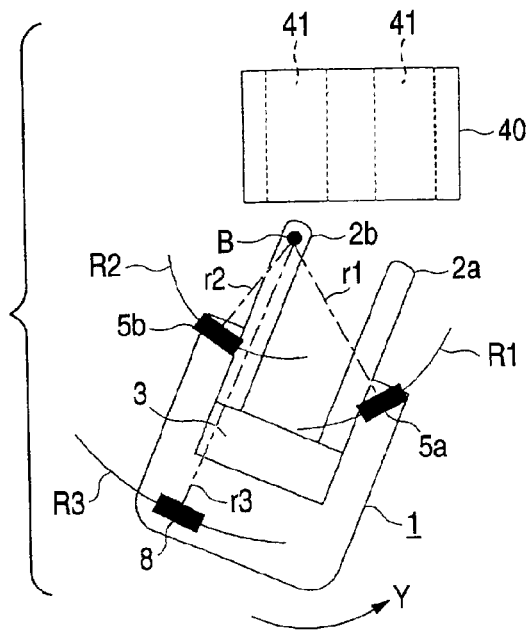
FIGS. 10A, 10B and 10C are diagrams explaining a turning operation.
Figure 11:
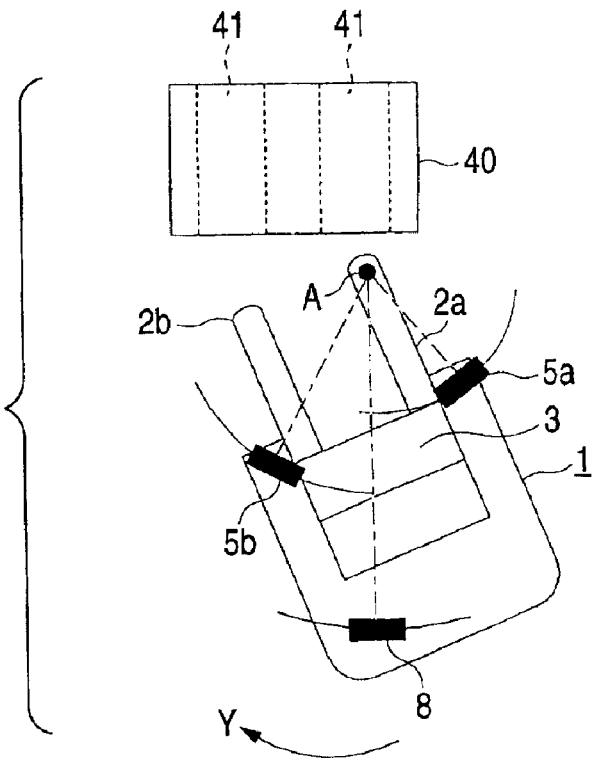
FIG. 11 is a diagram explaining another turning operation.

Here, to describe the turn of the body 1, for example, in the event that the "left" is taken as the center of turn, as shown in FIG. 10A, the body 1 turns in a direction indicated by an arrow Y about a distal end B of the left fork arm 2b as the center of turn. In addition, in the event that the "right" is taken as the center of turn, as shown in FIG. 11, the body 1 turns in a direction indicated by an arrow Y about a distal end A of the right fork arm 2a as the center of turn. Furthermore, in the event that the "center" is taken as the center of turn, the body 1 turns in a direction indicated by an arrow Y about a central portion C of a line connecting the distal ends A and B of the fork arms 2a and 2b as the center of turn. The respective figures will be described in detail later.

Figure 7:
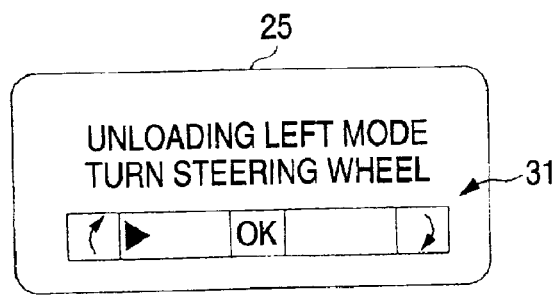
FIG. 7 is a diagram showing an example of a screen displayed in an information display part.
Figure 8:
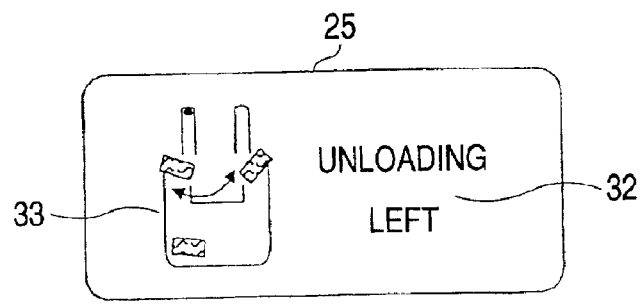
FIG. 8 is a diagram showing another example of a screen displayed in the information display part.

FIGS. 7 and 8 both illustrate examples of screens displayed in the information display part 25 after the center-of-turn selecting switch 21 is depressed, and these screens will be described in detail later.

Figure 9:
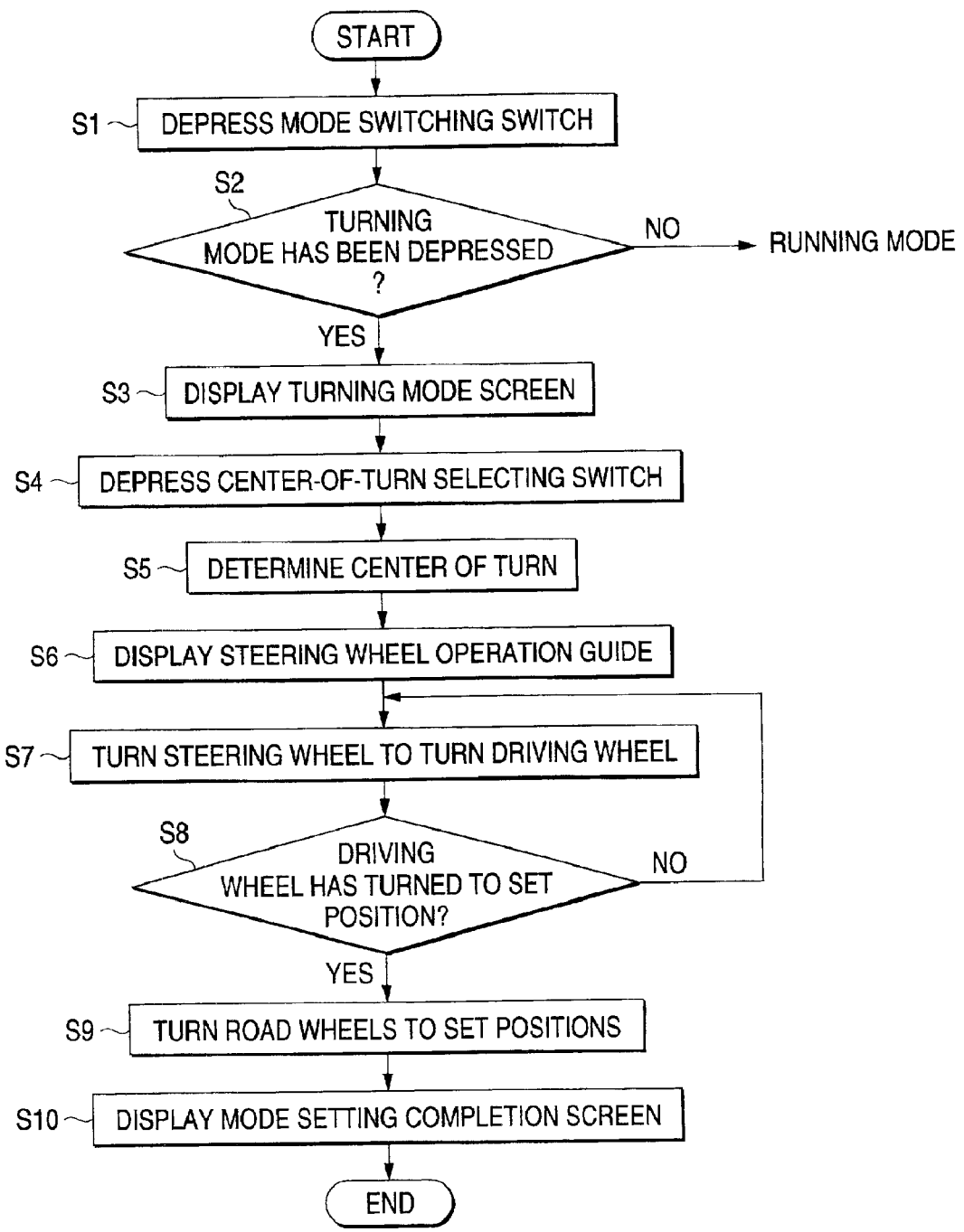
FIG. 9 is a flowchart illustrating a procedure in turning the forklift truck.

FIG. 9 is a flowchart illustrating a procedure for tuning the forklift truck 100. The turning operation of the forklift truck 100 will be described while following the flowchart. In the initial screen appearing on the display panel 14 shown in FIG. 4, when the mode switching switch 20 is depressed (step S1), it is decided which switch is depressed (step S2). In the event that the running mode switch 23 is depressed (step S2; NO), the forklift truck 100 is switched over to perform the normal running operation, and in contrast, in the event that the turning mode switch 24 is depressed (step S2; YES), the turning mode screen shown in FIG. 6 is displayed on the display panel 14 (step S3).

Next, any of the positions shown under the center-of-turn selecting switch 21 on the screen in FIG. 6 is depressed to select a center-of-turn for the body 1. Here, assume that the switch 21b is depressed to select the "left" as the center of turn. Then, when the center of turn is selected, what is so selected is then read in the controller 13, which determines the center of turn based on data stored in a memory (not shown) in advance (step S5). Following this, a steering wheel operation guide message 31 shown in FIG. 7 is displayed in the information display part 25 in the display panel 14 using characters and graphics (step S6).

When the operator follows the operation guide message 31 and turns the steering wheel 4 (turns clockwise in this example), the driving wheel 8 turns while interlocking with the steering wheel 4 (step S7). Whether or not the driving wheel 8 has turned to a predetermined angle set in advance is determined by looking at an output from the angle sensor 10 (step S8), and in the event that the driving wheel 8 has not yet turned to the set position (step S8; NO), the steering wheel 8 continues to be operated (step S7). When the driving wheel 8 has turned to the set position (step S8; YES), then the road wheels 5a, 5b are turned to set positions (step S9). Turning the road wheels is automatically carried out by the steering motors 6a, 6b. Namely, while monitoring outputs from the angle sensors 7a, 7b, the controller 13 continues to drive the steering motors 6a, 6b until the road wheels 5a, 5b are turned to the predetermined angles set in advance. When the road wheels 5a, 5b are turned to the set positions, a mode setting completion screen such as shown in FIG. 8 is displayed in the information display part 25 (step S10), thereby informing that the "left" has been selected as the center of turn. Shown on this screen are graphics 33 showing the mode and center of turn 32 so selected and orientations of the respective wheels.

In this state, the respective wheels are set in orientations shown in FIG. 10A relative to the center of turn B. Namely, the road wheel 5a is set in an orientation in which it follows along a circumference R1 with a radius r1 that would be formed about the center of turn B as the center thereof, the road wheel 5b is set in an orientation in which it follows along a circumference R2 with a radius r2 that would be formed about the center of turn B as the center thereof, and the driving wheel 8 is set in an orientation in which it follows along a circumference R3 with a radius r3 that would be formed about the center of turn B as the center thereof.

Consequently, when a running motor (not shown) is rotated to drive the driving wheel 8 from this state, the road wheels 5a, 5b and the driving wheel 8 start to move along the circumferences that would be formed about the center of turn B as the center thereof, whereby the body 1 turns in the direction indicated by the arrow Y (or turns in an opposite direction to the direction indicated by the arrow Y) about the center of turn B as a center of such a turn. Then, when the body 1 has turned to a position shown in FIG. 10 where the body 1 confronts directly the front of a pallet 40, the body 1 is stopped turning. The pallet 40 is identical to one shown in FIG. 19. When the mast 3 is fed forward by manipulating the levers 52 (FIG. 1) in this state (reaching out), as shown in FIG. 10(c), the fork arms 2a, 2b are inserted into insertion holes 41 in the pallet 40. Thereafter, the fork arms 2a, 2b are raised by manipulating further the operation levers 52 while returning the mast 3 to its original position (reaching in), whereby the pallet 40 and cargo (not shown) placed thereon can be unloaded. When unloading is completed, the standard mode switch 29 (FIG. 6) on the display panel 14 is depressed so as to switch the operation mode from the turning mode to the standard mode in the running mode, whereby the turning angles of the road wheels 5a, 5b and the driving wheel 8 are returned to zero so that the body 1 is allowed to move straight forward or rearward.

Thus, according to the embodiment, since the body 1 turns about the distal end B of the fork arm 2b, if the forklift truck 100 is moved such that the distal end B comes to a position just in front of the insertion hole 41 in the pallet 40, irrespective of the orientation of the body 1, the body 1 can easily be positioned so as to confront the front of the pallet 40 by turning, whereby the fork arms 2a, 2b can quickly be positioned relative to the insertion holes 41. Consequently, even beginners can perform the operation of inserting the fork arms 2a, 2b into the insertion holes 41, respectively, within a limited time, the efficiency of the unloading operation being thereby improved.

Figure 10B:
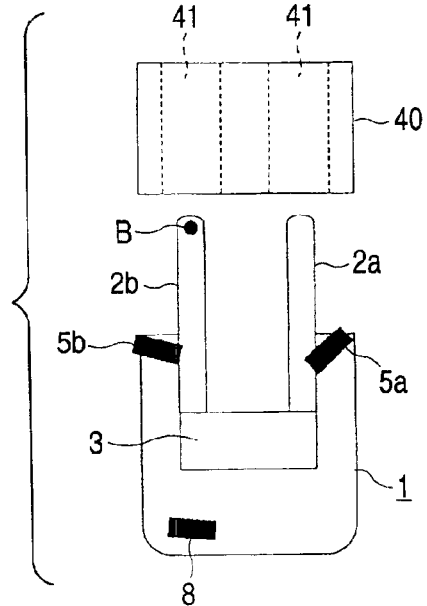
Figure 10C:
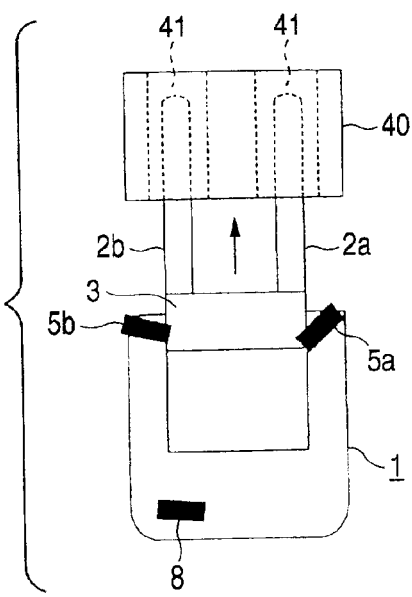

Note that while the above example has been described as in a case where the invention is applied to the reach forklift truck, in a case where the invention is applied to a counter balanced forklift truck, when the forklift truck comes to a state shown in FIG. 10B, the operation mode is switched over from the turning mode to the running mode and the turning angles of the road wheels 5a, 5b and the driving wheel 8 are returned to zero so that the body 1 can move straight ahead, whereby the fork arms 2a, 2b are inserted into the insertion holes 41 in the pallet 40 for unloading cargo.

In addition, in the above example, while the distal end B of the fork arm 2b is selected as the center of turn by depressing the center-of-turn selecting switch 21b, in a case where a center of turn A is selected by depressing the center-of-turn selecting switch 21a, as shown in FIG. 11, the orientations of the road wheels 5a, 5b and the driving wheel 8 are set such that a distal end A of the fork arm 2a becomes the center of turn and the body 1 rotates in a direction indicated by an arrow Y about the distal end A.

Figure 12:
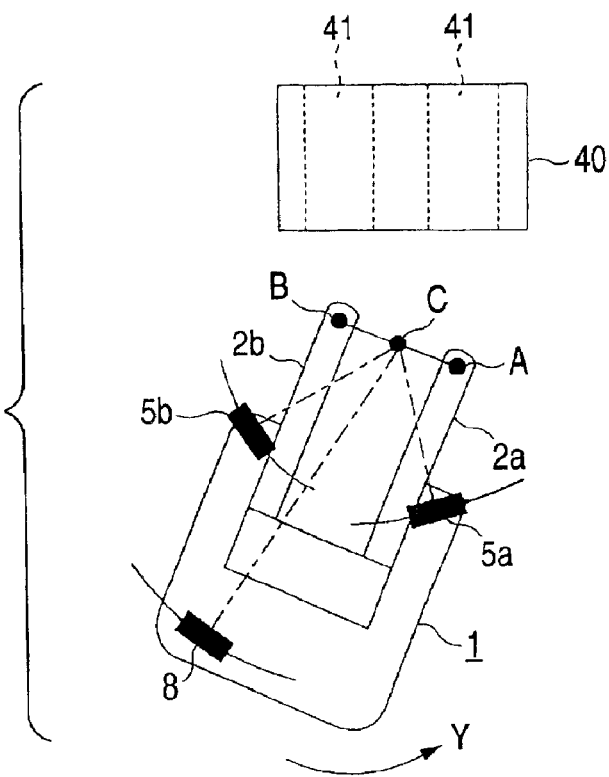
FIG. 12 is a diagram explaining a further turning operation.

Furthermore, in a case where the center-of-turn selecting switch 21c, as shown in FIG. 12, the orientations of the road wheels 5a, 5b and the driving wheel 8 are set such that the distal end A of the fork 2a becomes the center of turn, whereby the body 1 turns in a direction indicated by an arrow Y about the central portion C as the center of turn.

Figure 13:
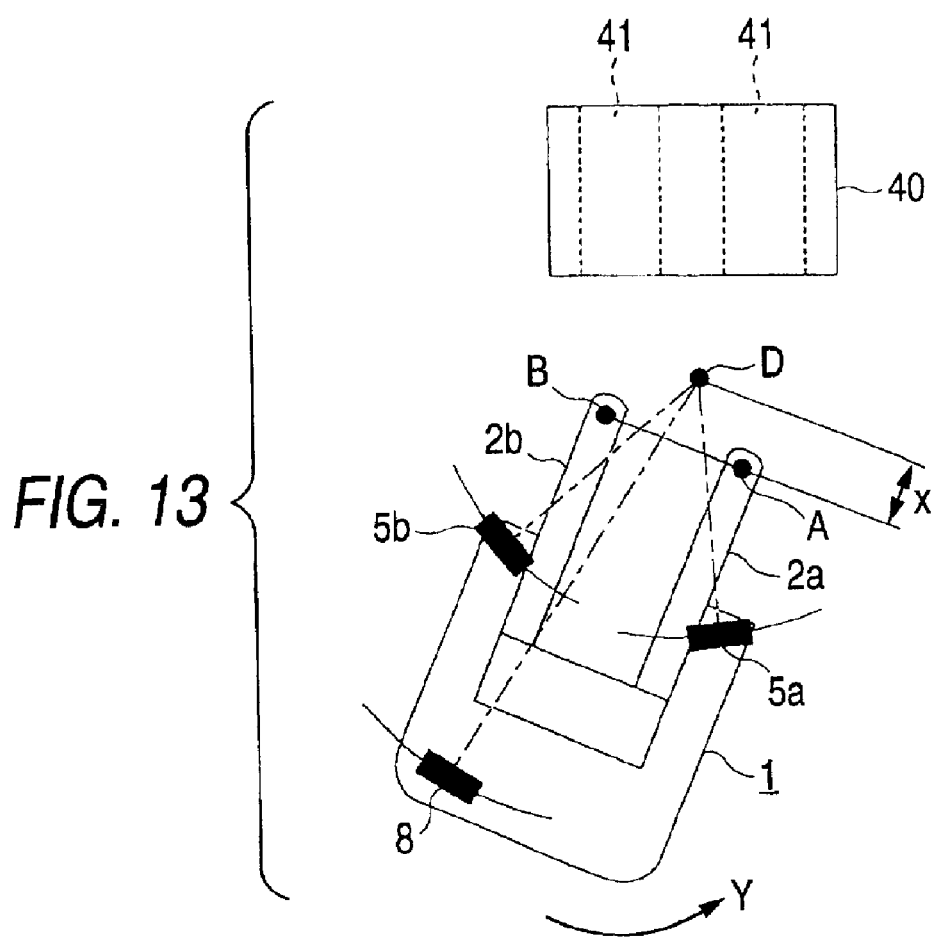
FIG. 13 is a diagram explaining another turning operation.

Furthermore, a switch may be added to the center-of-turn selecting switch 21, so that as shown in FIG. 13, the orientations of the road wheels 5a, 5b and the driving wheel 8 are set such that a position D frontward a predetermined distance x from the distal end A of the fork arm 2a and the distal end B of the fork arm 2b becomes the center of turn, whereby the body 1 turns about the frontward position D as the center of turn.

In any of the cases shown in FIGS. 11 to 13, as in the case shown in FIG. 10, the orientations of the road wheels 5a, 5b and the driving wheel 8 are set such that they follow along circumferences that would be formed about the center of turn as the center of thereof.

Figure 14:
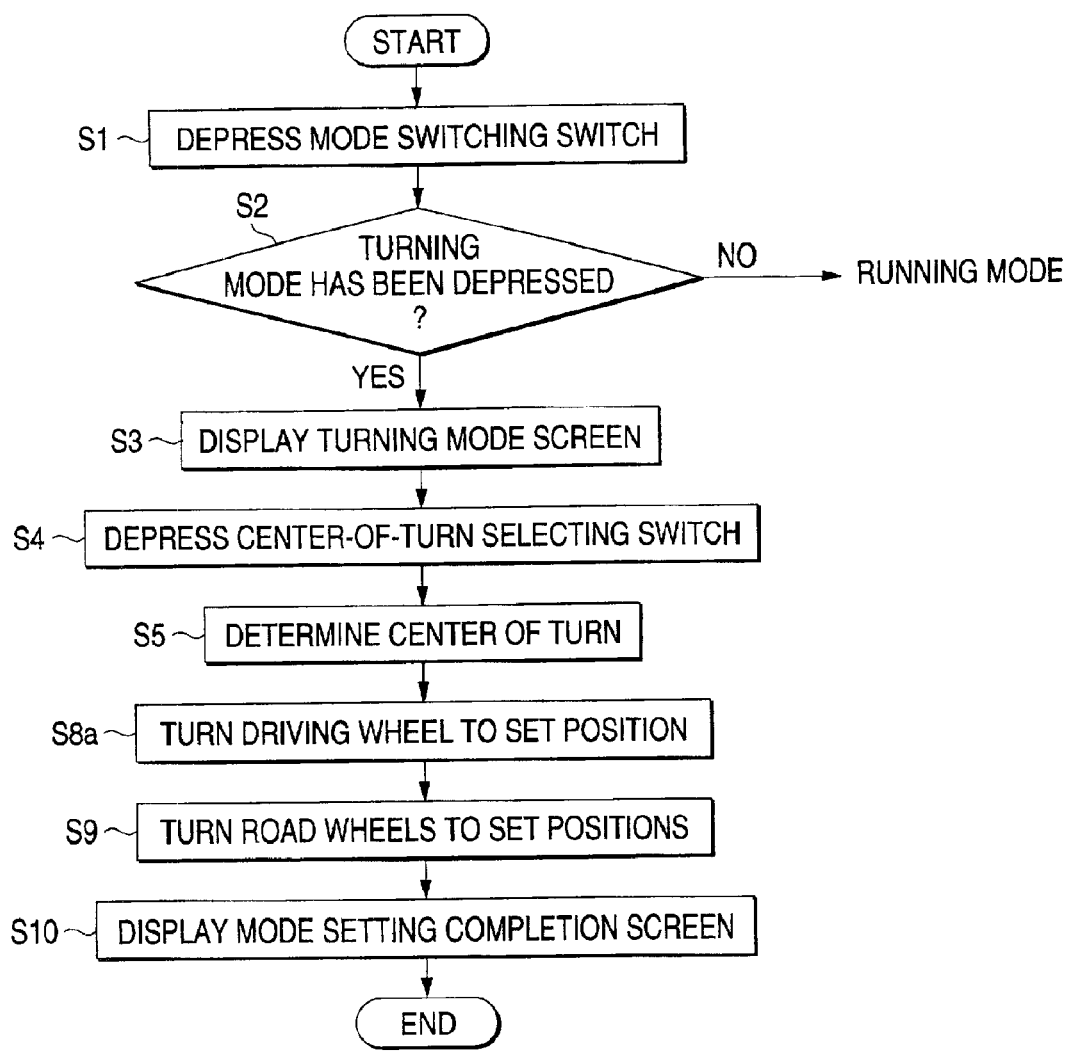
FIG. 14 is a flowchart associated with another embodiment of the invention.

Incidentally, while in the example shown in FIG. 9, after the center of turn is determined by depressing the center-of-turn selecting switch 21 the operator manually operates the steering wheel 4 in accordance with the steering wheel operation guide displayed in the display panel 14 so as to turn the driving wheel 8 to the predetermined angle, the series of operations can automatically be performed. FIG. 14 shows a flowchart illustrating a procedure for such an automatic operation, and like reference numerals are given to portions like to those described with reference to FIG. 9.

In FIG. 14, when the mode switching switch 20 on the display panel 14 is depressed (step S1), it is decided which switch has been depressed (step S2), and in a case where the turning mode switch 24 is depressed, the turning mode screen is displayed in the display panel 14 (step S3). When the center of turn is selected using the center-of-turn selecting switch 21 (step S4), the controller 13 determines the center of turn (step S5). This series of operations is totally identical to that described while referring to FIG. 9.

Next, the driving wheel 8 is turned based on the center of turn so determined until the driving wheel 8 is oriented so as to follow along a circumference that would be formed about the distal end B of the fork arm 2b as the center thereof (step S8a). Another steering motor (not shown) is provided in addition to the steering motor 9 for this purpose. Then, while monitoring the turning angle of the driving wheel 8 through the angle sensor 10, the controller 13 drives the steering motor, and the motor is stopped when the turning angle of the driving wheel reaches a set value. Thereafter, similarly to the case described with reference to FIG. 9, the road wheels 5a, 5b are turned to the set positions (step S9) by means of the steering motors 6a, 6b, and after the turn of the road wheels is completed the mode setting completion screen shown in FIG. 8 is displayed in the information display part 25 (step S10).

According to the embodiment shown in FIG. 14, only by selecting the center of turn by depressing the center-of-turn selecting switch 21 the driving wheel 8 and the road wheels 5a, 5b are automatically turned and the body 1 is set ready to turn about the center of turn so selected, and therefore the load borne by the operator in operating the forklift truck 100 can be reduced further.

Figure 15:
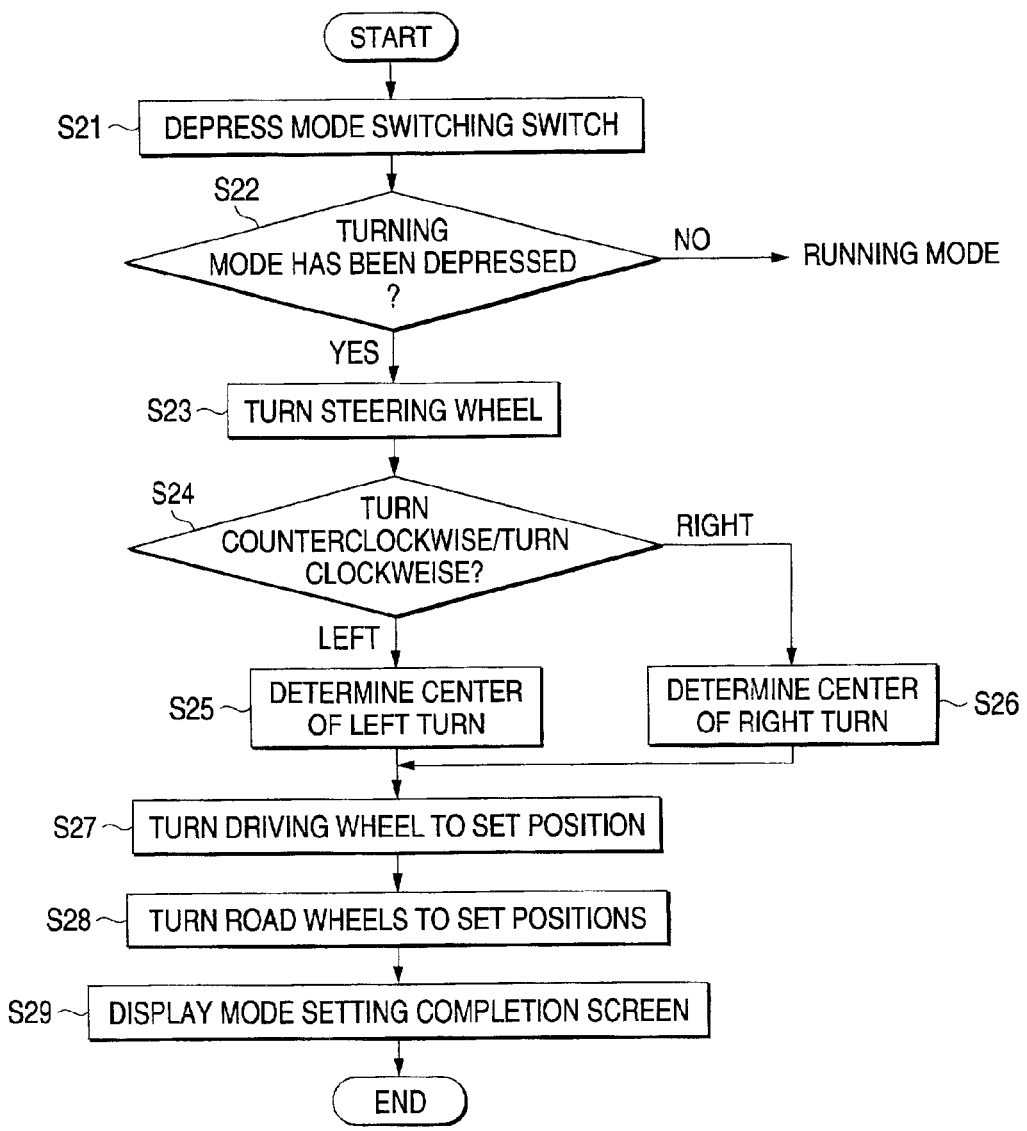
FIG. 15 is a flowchart associated with a further embodiment of the invention.

FIG. 15 shows a flowchart associated with another embodiment of the invention. While in the previous example the center of turn is determined by depressing either of the center-of-turn selecting switches 21, in an example shown in FIG. 15 the center of turn is designed to be determined depending upon directions in which the steering wheel is turned. In this case, only either of the distal end A of the fork arm 2b and the distal end B of the fork arm 2b can be the center of turn.

In FIG. 15, when the mode switching switch 20 is depressed (step S21), it is determined which switch has been depressed (step S22). In a case where the running mode switch 23 has been depressed (step S22: NO), the normal running operation is taken. In a case where the turning mode switch 24 has been depressed (step S22: YES), displayed in the display panel 14 shown in FIG. 6 is the right turn or left turn of the steering wheel instead of the center-of-turn selecting switch 21, and the operator turns the steering wheel 4 in either of the directions (step S23). The controller 13 decides the turning direction of the steering wheel then (step S24), and in the event that the steering wheel is turned counterclockwise, as in the case shown in FIG. 10, the distal end B of the fork arm 2b is decided as the center of turn (step S25). In contrast, in the event that the steering wheel is turned clockwise, as in the case shown in FIG. 11, the distal end A of the fork arm 2a is decided as the center of turn (step S26).

The following operations are similar to those described with reference to FIG. 14, and the driving wheel 8 is turned to the set position or the position where the driving wheel 8 is oriented so as to follow along the circumference that would be formed about the distal end B of the fork arm 2b as the center thereof (step S27), and the road wheels 5a, 5b are also turned to the set positions, respectively (step S28). Then, when the turn of the respective wheels is completed, the mode setting completion screen shown in FIG. 8 is displayed in the information display part 25 (step S29). Note that while the procedure of automatically turning the driving wheel 8 is described here, the driving wheel 8 may be turned by operating the steering wheel in the manner described with reference to FIG. 9.

According to the embodiment shown in FIG. 15, the center-of-turn selecting switch 21 is no more required, and only by turning the steering wheel in either of the directions the distal end of the fork arm on the side to which the steering wheel is turned is automatically set as the center of turn, and therefore, the operations become simpler.

Figure 16A:
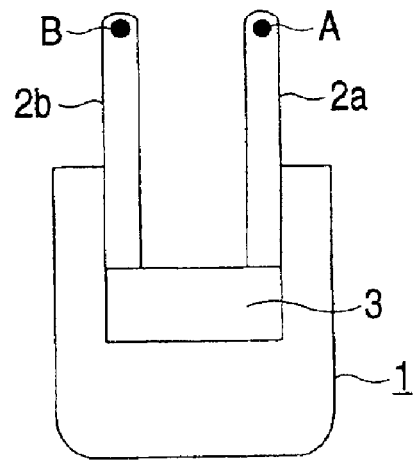
FIGS. 16A and 16B are diagrams explaining reach-out and reach-in of fork arms.
Figure 16B:
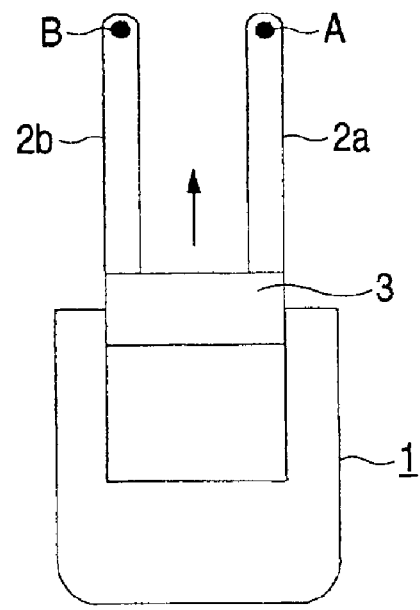

Incidentally, in a case where the forklift truck 100 is a reach forklift truck, since the fork arms 2a, 2b are provided in such a manner as to freely move in the longitudinal directions of the body 1, the position of the distal ends A, B of the fork arms 2a, 2b varies to a reach-in condition shown in FIG. 16A and a reach-out condition shown in FIG. 16B, respectively. To cope with this, as a further embodiment of the invention, it can be contemplated that the center of turn is determined based on the position of the fork arms 2a, 2b which have been moved relative to the body 1.

In this case, the position of the fork arms 2a, 2b can be detected by the potentiometer 12 (FIGS. 2, 3) for detecting the position of the fork arms. To describe a specific constitution that can be contemplated therefor, for example, one end of a wire (not shown) is connected to a lower end of the mast 3, and the other end of the wire is taken up around a take-up reel (not shown) provided on the body 1, so that the number of times of turns of the take-up reel which turns in association with the movement of the mast is detected by the potentiometer 12. An encoder may be used as the fork arm a position detecting section instead of the potentiometer 12.

The controller 13 calculates a center of turn for the body 1 based on the position of the fork arms 2a, 2b so detected and sets the road wheels 5a, 5b and the driving wheel 8 such that they are oriented so as to follow along a circumference that would be formed about the center of turn. According to the construction, the center of turn can accurately be determined irrespective of the position of the fork arms 2a, 2b.

In addition, a device (for example, a potentiometer) detecting transverse positions of the fork arms may be provided for a forklift truck in which the two fork arms can be moved transversely in opposite directions so as to freely verify the space therebetween and a forklift truck in which the two fork arms can be moved in the same direction with the space between the fork arms being kept constant, and when the fork arms are moved transversely, outputs from the detecting device so provided are used as operation elements to suitably determine the center of turn.

Incidentally, after the body 1 has been set ready to turn, as has been described before, the running motor is driven to turn the body 1 and is then stopped when the body 1 has turned to a position where it confronts the front of the pallet 40 for unloading cargo. However, in a case where the forklift truck 100 is run again after the cargo has been unloaded, the body 1 has to be ready to move straight. However, if the operator is being careless to fail to switch the operation mode from the turning mode back to the running mode, or if the operator starts to run the vehicle before the respective wheels have not been returned to the state in which the vehicle is ready to move straight even after he or she has switched the operation mode back to the running mode, there would be caused a risk of the body 1 being caused to turn or to start to move in an unexpected direction, resulting in an extremely dangerous situation.

To cope with this or to avoid the risk resulting in the dangerous situation, it is desirable to prohibit the body 1 from starting to run until the operation mode has been switched from the turning mode back to the running mode after the turn of the body has been completed and the wheels have been returned to the state where the body 1 is allowed to move straight.

Figure 17:
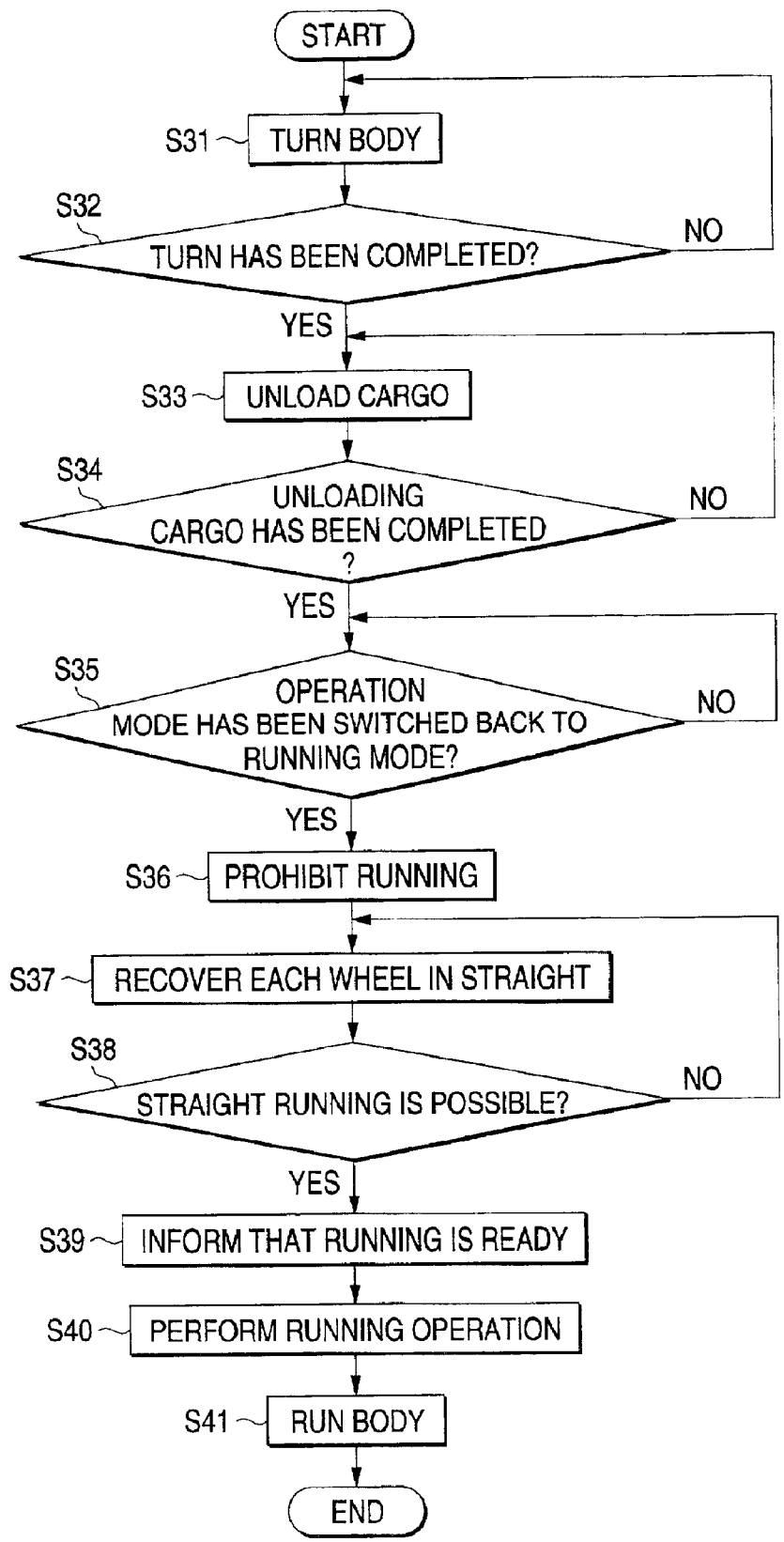
FIG. 17 is a flowchart associated with another embodiment of the invention.

FIG. 17 is a flowchart showing a procedure for such a case, and the procedure will be described as in a case where the invention is applied to the reach forklift truck. Firstly, the body 1 is turned (step S31), and when the turn is completed (step S32; YES), a reach-out operation is implemented for unloading cargo with the fork arms 2a, 2b (step S33). when unloading cargo is completed (step S34; YES), whether or not the operation mode has been switched from the turning mode back to the running mode is determined (step S35). If the operation mode has not yet been switched back to the running mode, wait until the switching back of the operation mode is completed (step S35; NO), and if the operation mode is switched back to the running mode (step S35; YES), an electromagnetic brake of the running motor is activated so as to prohibit the body from running (step S36). Thereafter, the road wheels 5a, 5b and the driving wheel 8 are returned to the straight conditions (in which the turning angles thereof are zero) (step S37).

When the respective wheels are returned to the straight conditions, the body 1 gets ready to move straight (step S38; YES), and at this point in time the information device (FIG. 3) informs the operator that the forklift truck 100 gets ready to run (step S39). This information device is constituted by, for example, a buzzer and even if a running operation is carried out before the buzzer is activated, the body 1 does not start. When the operator carries out the running operation upon hearing the sound of the buzzer activated (step S40), the body 1 starts to move straight forward or rearward (step S41). Note that a chime may be used for the information device 22 instead of the buzzer. In addition, instead of or in addition to the information by sound using the information device 22, a message informing that running is permitted may be displayed on the display panel 14. As this occurs, the display panel 14 constitutes an information section according to the invention.

Thus, according to the embodiment shown in FIG. 17, since the operation mode is switched back to the running mode after the turn of the body is completed (step S35) and the body 1 is allowed to run on condition that the respective wheels are returned to the condition in which the straight running is permitted (step S38), the safety is ensured by preventing the body 1 from being caused to turn or to start to run in an unexpected direction due to carelessness of the operator. In addition, since the information is given by sound or display that the forklift truck gets ready to run, the operator is allowed to perform the running operation in a smooth fashion.

In addition, in a case where the forklift truck 100 is a counterbalanced forklift truck, in FIG. 17, when the turn of the body is completed in step S32, then the flow advances to step S35, and the unloading operation which is carried out in step S33 in the aforesaid description is moved to follow step S41.

While the fork arms have been described as in the case where two fork arms are used in the above embodiments, the invention may be applied to a cargo handling vehicle employing three or more fork arms.

Second Embodiment

Next, embodiments on a forklift truck 200 will be described with reference to the drawings. The same elements already appearing in the aforementioned description are referred to with the same reference numerals thereto. The structure of the forklift truck 200 is the same as the forklift truck 100 as shown in FIGS. 1 and 2.

Figure 18:
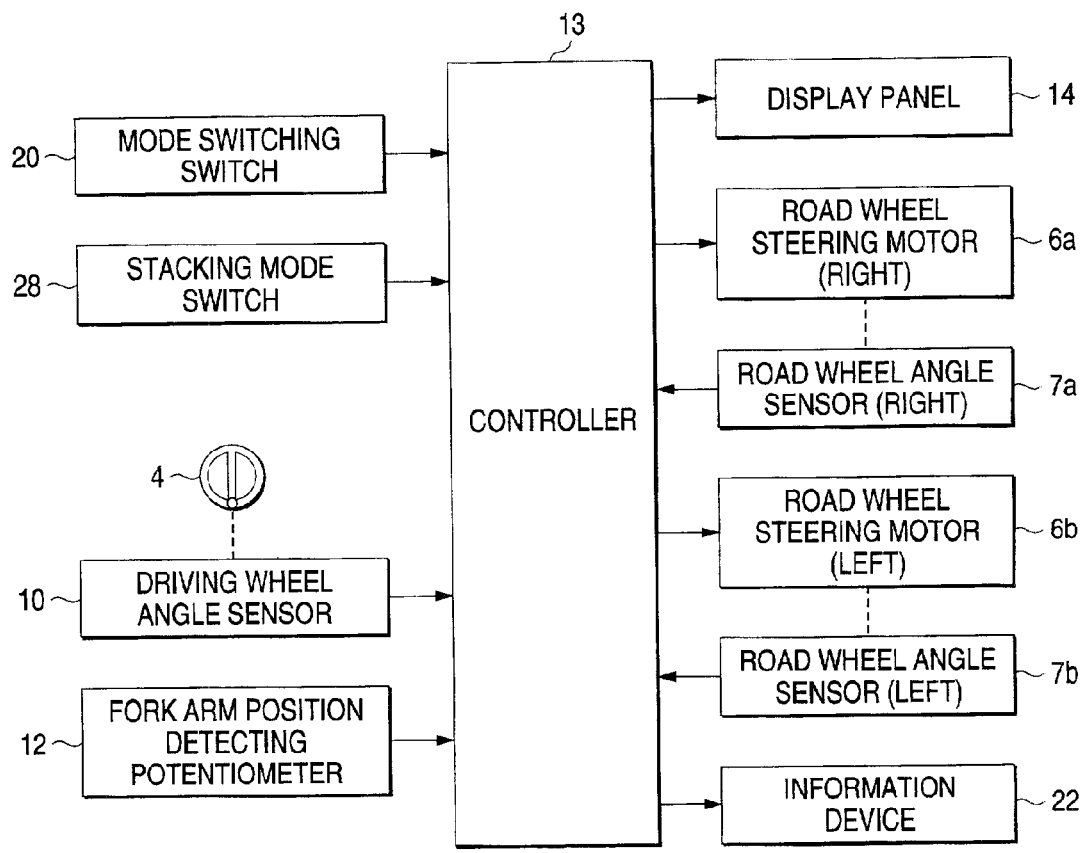
FIG. 18 is a block diagram showing the electrical configuration of the forklift truck.

FIG. 18 is a block diagram showing the electrical configuration of the forklift truck 200, and like reference numerals are imparted to portions like to those described with reference to FIG. 2. Shown in the figure are blocks only which are related to the invention, and the steering motor 9 and the angle sensor 10 for the driving wheel 8, the other motors, the operation levers, various switches and the like are therefore omitted. A mode switching switch 20 constitutes a a mode switching section according to the invention, and an information device 22 constitutes an an information section of the invention. In addition, the controller 13 constitutes a a center-of-turn position calculating section according to the invention. A stacking mode switch 28 is, as will be described later, a switch for turning the body 1 in performing a pallet stacking operation and constitutes a part of a a center-of-turn selecting section of the invention.

FIG. 4 illustrates an example of an initial screen appearing on the display panel 14. Provided on the display panel 14 are a running mode switch 23 for selecting a normal running mode and a turning mode switch 24 for selecting a turning mode, and the mode switching switch 20 shown in FIG. 18 is constituted by these switches 23, 24. Reference numeral 25 denotes an information display part for displaying various types of pieces of information.

In FIG. 4, when the running mode switch 23 is depressed, the screen of the display panel 14 is switched over to a running mode screen such as shown in FIG. 5. Displayed on this screen is a running direction selecting switch 26 for selecting a running direction for the forklift truck 200. When any of directions shown under the running direction selecting switch 26 is depressed, characters or symbols indicating an associated steering wheel operation are displayed in the information display part 25, but it is not the main part of the invention, and therefore the detailed description thereof is omitted here.

In FIG. 4, when the turning mode switch 24 is depressed, the screen of the display panel 14 is switched over to a turning mode screen such as shown in FIG. 6. Displayed on this screen is an unloading mode switch 21 in addition to the stacking mode switch 28 shown in FIG. 18 as a switch for selecting a center of turn for the forklift truck 200. These switches 21, 28 constitute the center-of-turn selecting. The unloading mode switch 21 is constructed so as to select three positions such as "right," "left," and "center" as the center of turn of the forklift truck 200, and there are provided a total of three center-of-turn selecting switches 21a to 21c which correspond to those three positions, respectively. Reference numeral 29 denotes a standard mode switch for switching the operation mode from the turning mode back to the normal running mode for preparing a condition (a standard mode) in which the vehicle is ready to move straight. This standard mode switch 29 constitutes the mode switching switch of the invention together with the switches 23, 24 shown in FIG. 4.

FIGS. 7 and 8 both illustrate examples of screens displayed in the information display part 25 after the unloading mode switch 21 is depressed, and examples of screens displayed in the information display part 25 after the stacking mode switch 28 is depressed. These screens will be described in detail later.

Figure 22:
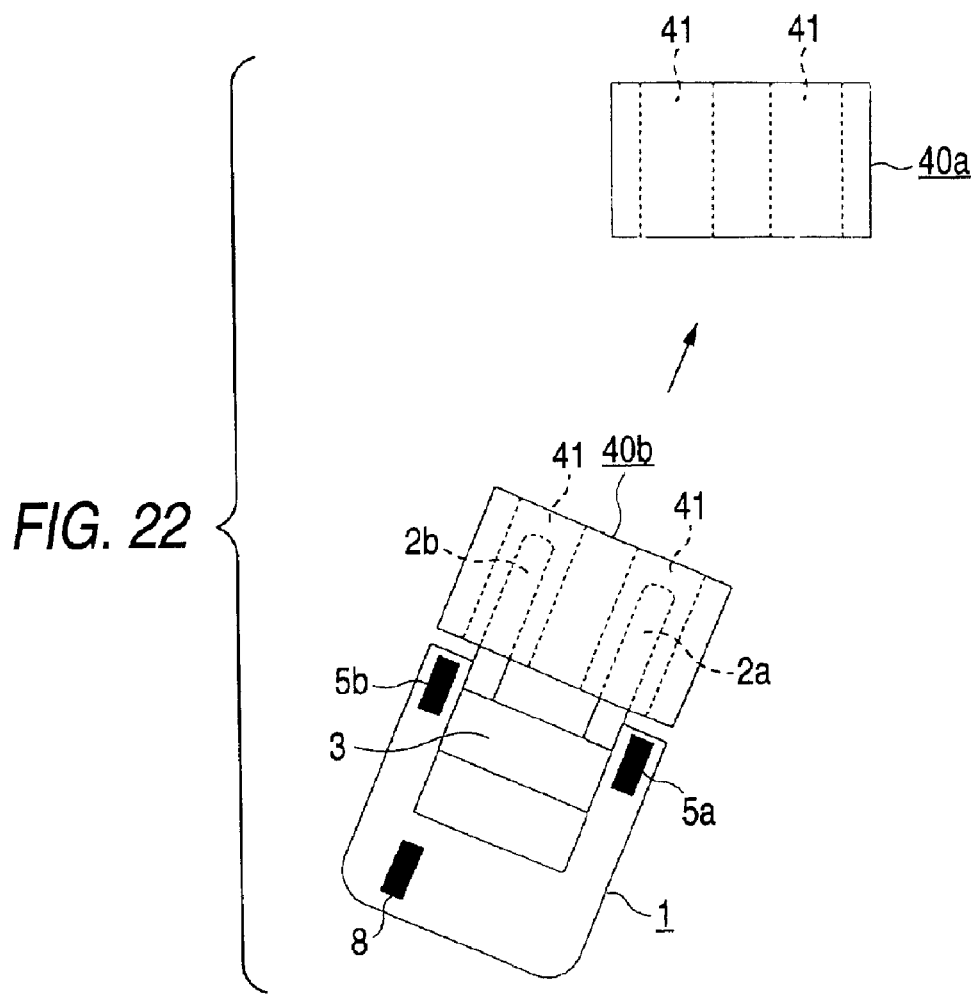
FIG. 22 is a diagram explaining a stacking operation.
Figure 23:
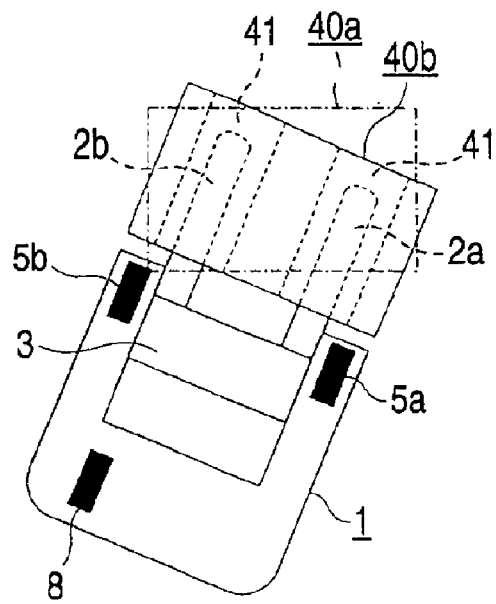
FIG. 23 is a diagram explaining another stacking operation.
Figure 32:
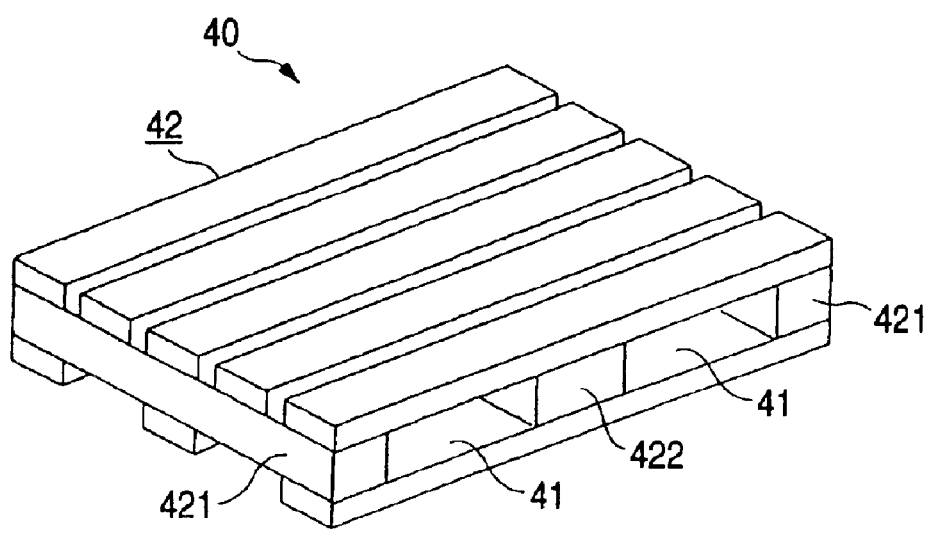
FIG. 32 is a perspective view of a pallet.

Next, a procedure of stacking pallets will be described. Note that pallets 40a, 40b to be handled below are identical to those shown in FIG. 32. As shown in FIG. 22, the forklift truck 200 carrying the pallet 40b by inserting the fork arms 2a, 2b into the insertion holes 41 therein is caused to run straight toward the pallet 40a stacked at a predetermined place and is stopped, as shown in FIG. 23, at a position where the centers of the pallets 40b and 40a substantially coincide with each other. Thereafter, the operation mode is switched from the running mode to the turning mode, so that the body 1 is set to a state in which the body 1 can turn in a direction indicated by an arrow Y about a point P shown in FIG. 24 as the center of turn. This will be described in detail later.

Figure 21:
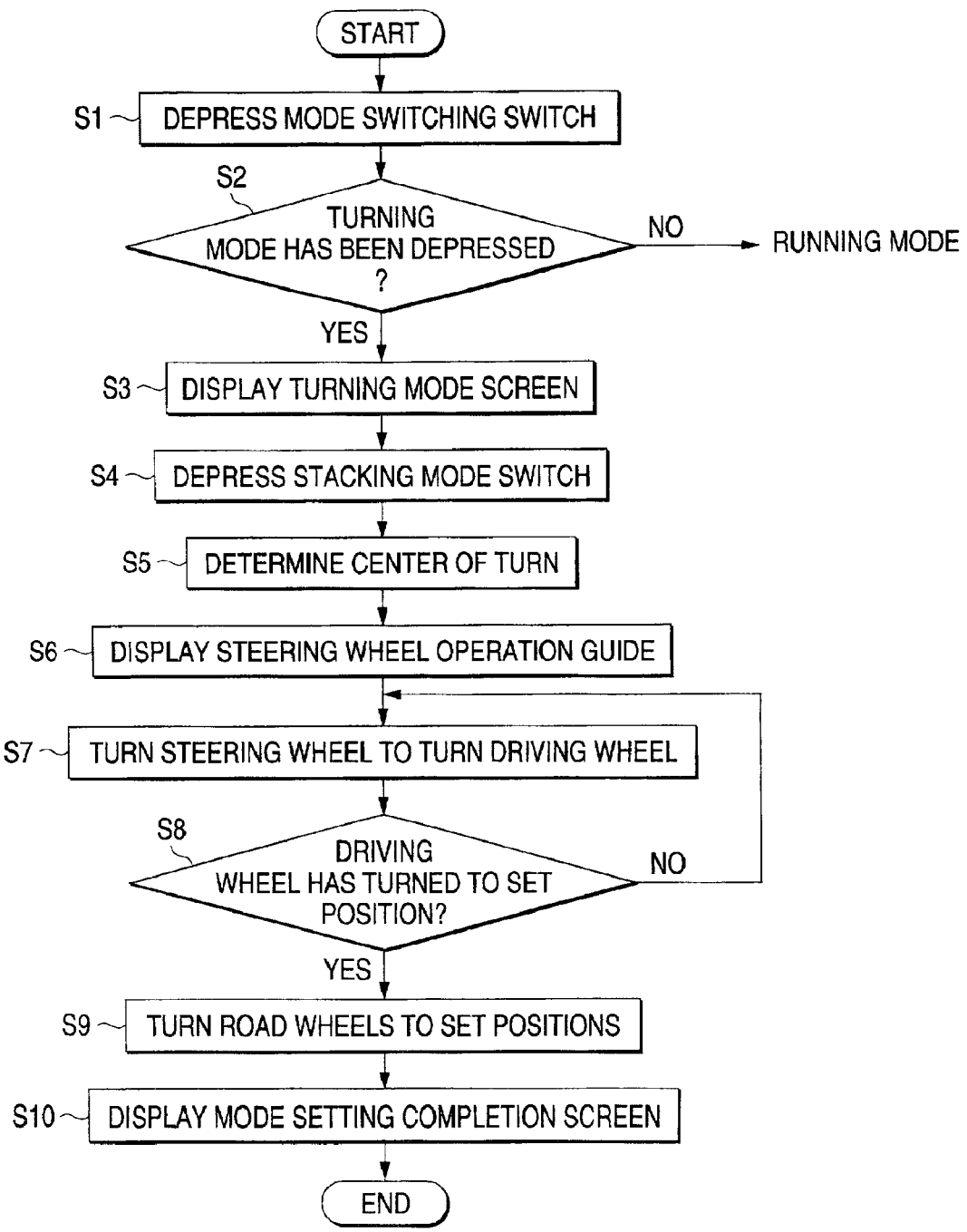
FIG. 21 is a flowchart illustrating a procedure of turning the forklift truck.

FIG. 21 is a flowchart illustrating a procedure of turning the forklift truck 200. Firstly, in the initial screen on the display panel 14 shown in FIG. 4, when the mode switching switch 20 is depressed (step S1), it is decided which switch has been depressed (step S2). In the event that the running mode switch 23 is depressed (step S2; NO), the operation mode is shifted to the normal running operation, whereas when the turning mode switch 24 is depressed (step S2; YES), the turning mode screen shown in FIG. 6 is displayed on the display panel 14 (step S3).

Figure 19:
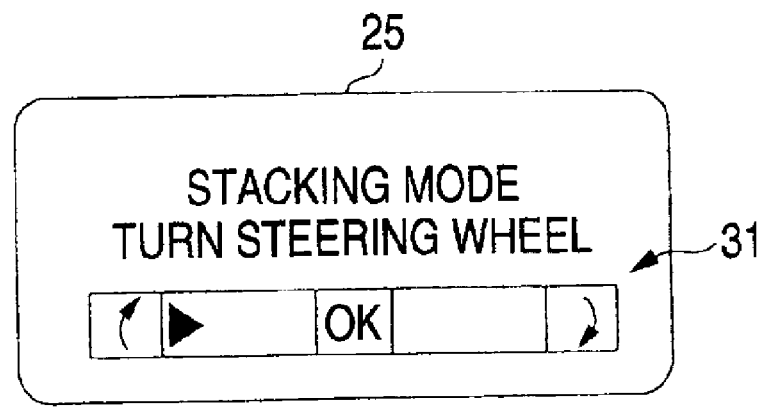
FIG. 19 is a diagram showing an example of a screen displayed in the information display part.

Next, the stacking mode switch 28 is depressed on the screen in FIG. 6 (step S4), what is selected is then read in the controller 13, which determines a center of turn for the stacking mode based on data stored in a memory (not shown) in advance (step S5). Following this, a steering wheel operation guide message 31 shown in FIG. 19 is displayed in the information display part 25 in the display panel 14 using characters and graphics (step S6).

Figure 20:
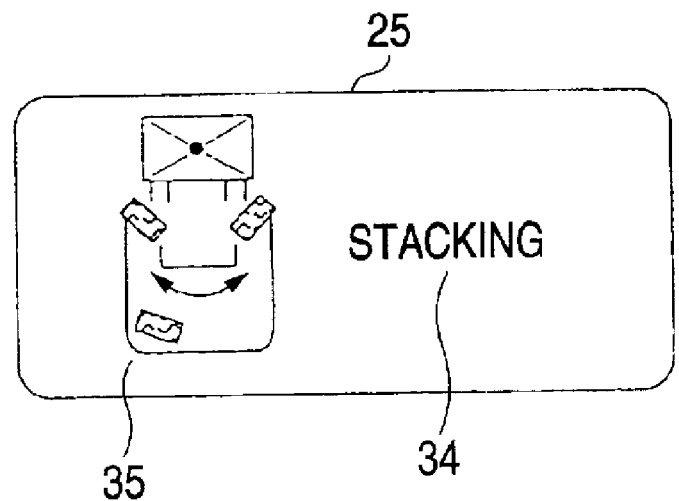
FIG. 20 is a diagram showing another example of a screen displayed in the information display part.

When the operator follows the operation guide message 31 and turns the steering wheel 4 (turns clockwise in this example), the driving wheel 8 turns while interlocking with the steering wheel 4 (step S7). Whether or not the driving wheel 8 has turned to a predetermined angle set in advance is determined by looking at an output from the angle sensor 10 (step S8), and in the event that the driving wheel 8 has not yet turned to the set position (step S8; NO), the steering wheel 8 continues to be operated (step S7). When the driving wheel 8 has turned to the set position (step S8; YES), then the road wheels 5a, 5b are turned to set positions (step S9). Turning the road wheels is automatically carried out by the steering motors 6a, 6b. Namely, while monitoring outputs from the angle sensors 7a, 7b, the controller 13 continues to drive the steering motors 6a, 6b until the road wheels 5a, 5b are turned to the predetermined angles set in advance. When the road wheels 5a, 5b are turned to the set positions, a mode setting completion screen such as shown in FIG. 20 is displayed in the information display part 25 (step S10), thereby informing that the center of turn for the stacking mode has been selected. Shown on this screen are a mode 34 and graphics 35 showing the orientations of the respective wheels.

Figure 24:
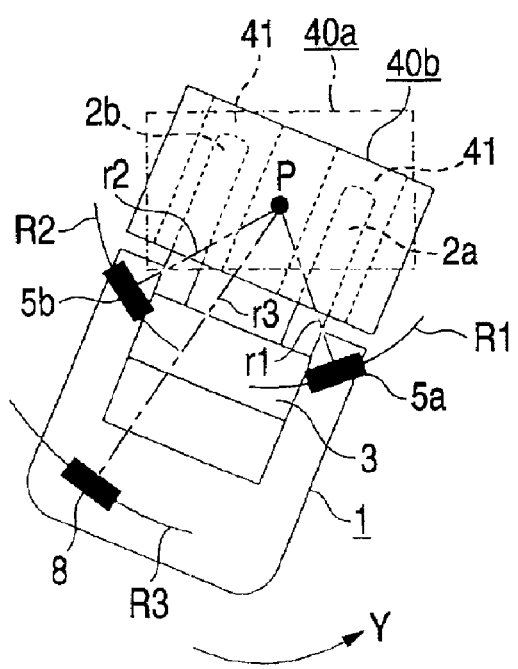
FIG. 24 is a diagram explaining a further stacking operation.

In this state, the center of turn and the respective wheels are set as shown in FIG. 24. Namely, the center of turn P is set substantially at a longitudinally and transversely central portion of the fork arms 2a, 2b in such a manner as to align substantially with the center of the pallet 40b. In addition, the road wheel 5a is set in an orientation in which it follows along a circumference R1 with a radius r1 that would be formed about the center of turn P, the road wheel 5b is set in an orientation in which it follows along a circumference R2 with a radius r2 that would be formed about the center of turn P, and the driving wheel 8 is set in an orientation in which it follows along a circumference R3 with a radius r3 that would be formed about the center of turn P.

Consequently, when a running motor (not shown) is rotated to drive the driving wheel 8 from this state, the road wheels 5a, 5b and the driving wheel 8 start to move along the circumferences that would be formed about the center of turn B as the center thereof, whereby the body 1 turns in the direction indicated by the arrow Y (or turns in an opposite direction to the direction indicated by the arrow Y) about the center of turn B as a center of such a turn. Then, when the pallet 40b comes to a position shown in FIG. 25 where the pallet 40b overlaps the pallet 40a, the body 1 is stopped turning. Next, the fork arms 2a, 2b are lowered from the condition shown in FIG. 25 by operating the operation levers 52 (FIG. 1), the pallet 40b is placed over the pallet 40a in alignment with each other, the stacking operation being thereby completed. Thereafter, the operation mode is switched from the running mode to the standard mode in the running mode by depressing a standard mode switch 29 (FIG. 6) on the display panel 14, and as shown in FIG. 26, the turning angles of the road wheels 5a, 5b and the driving wheel 8 are returned to zero, whereby the body 1 can move straight rearward.

Thus, according to the embodiment, since the body 1 turns about substantially the central portion of the pallet 40b as the center of turn, if the forklift truck 200 continues to be run to the position where the center of the pallet 40b overlaps substantially the center of the pallet 40a, irrespective of the orientation of the body 1, the pallet 40b can easily be overlapped on the pallet 40a b by turning the body 1. Consequently, even beginners can perform the operation of stacking pallets within a short period of time, the efficiency of the pallet stacking operation being thereby improved.

Figure 27A:
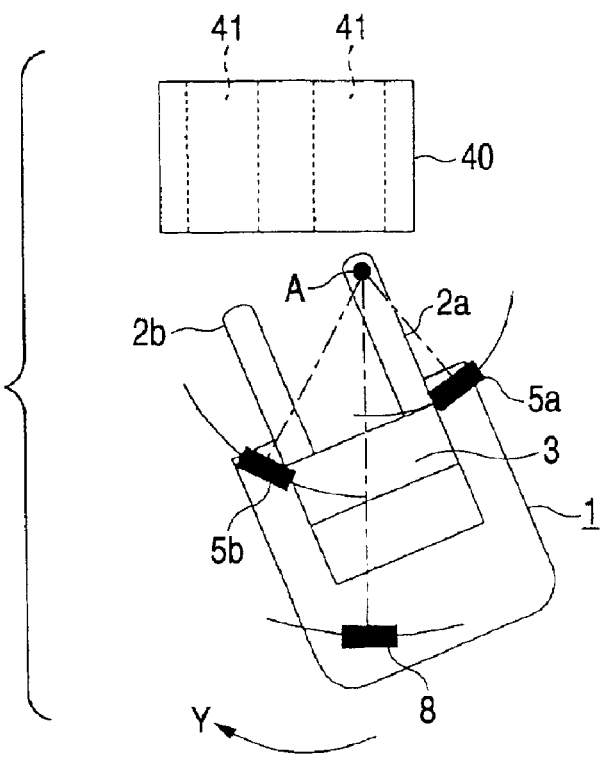
FIGS. 27A and 27B are diagrams illustrating a flowchart of carrying out an unloading operation.
Figure 27B:
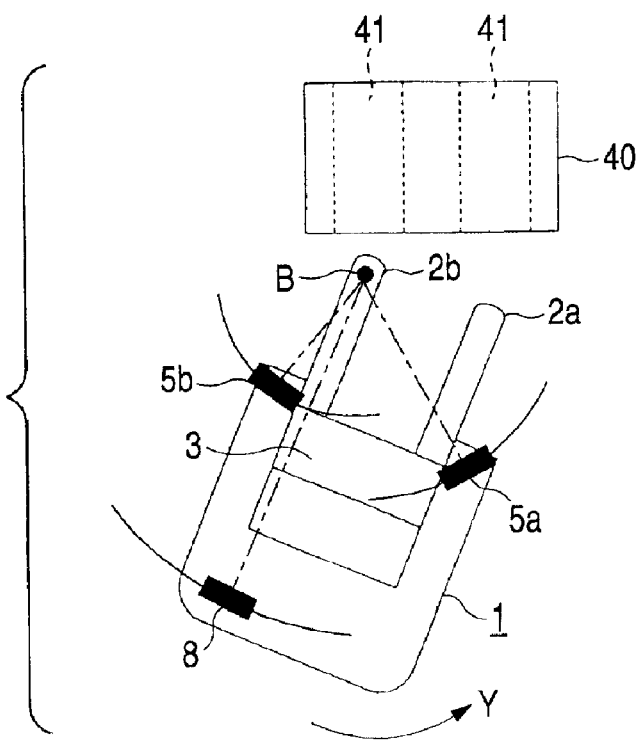

Next, the operation of the unloading mode will be described in which cargo loaded on the pallet is unloaded. In the event that the switch 21a of the unloading mode switch 21 is depressed, as shown in FIG. 27A, the orientations of the road wheels 5a, 5b and the driving wheel 8 are set such that a distal end A of the right fork arm 2a becomes the center of turn, and the body 1 turns in a direction indicated by an arrow Y about the distal end A of the fork arm 2a. In addition, in the event that the switch 21b of the unloading mode switch 21 is depressed, as shown in FIG. 27B, the orientations of the road wheels 5a, 5b and the driving wheel 8 are set such that a distal end B of the right fork arm 2b becomes the center of turn, and the body 1 turns in a direction indicated by an arrow Y about the distal end B of the fork arm 2b. Additionally, in the event that the switch 21c is depressed, although not shown, the orientations of the respective wheels are set such that a central portion of a line connecting the distal ends A, B becomes the center of turn, and the body 1 turns about the central portion as the center of turn.

In either case, when the unloading mode switch 21 is depressed, a steering wheel operation guiding message 31 as shown in FIG. 7 is displayed in the information display part 25 in the display panel 14 (a case is shown in which the switch 21b is depressed). Similarly to the case described with reference to FIG. 24, when by turning steering wheel 4 the driving wheel 8 is set in an orientation in which it follows along a circumference that would be formed about the center of turn by the driving wheel 8 and the road wheels 5a, 5b are set in orientations in which they follow along circumferences that would be formed about the center of turn, a mode setting completion screen as shown in FIG. 8 is displayed in the information display part 25, whereby it is informed that the center of turn for the unloading mode has been set. Displayed on this screen are graphics 33 illustrating the mode, the center of turn 32 and the orientations of the wheels. The body 1 can easily be positioned in front of the pallet 40 on which cargo is loaded by turning the body 1 as has been described heretofore, whereby the cargo can easily be unloaded by allowing the fork arms 2a, 2b to be inserted into the insertion holes 41.

As has been described heretofore, the center of turn of the forklift truck 200 may be selected to purposes by providing the unloading mode switch 21 in addition to the stacking mode switch 28, whereby the forklift truck can be made to cope with both the unloading and stacking operations.

Figure 28:
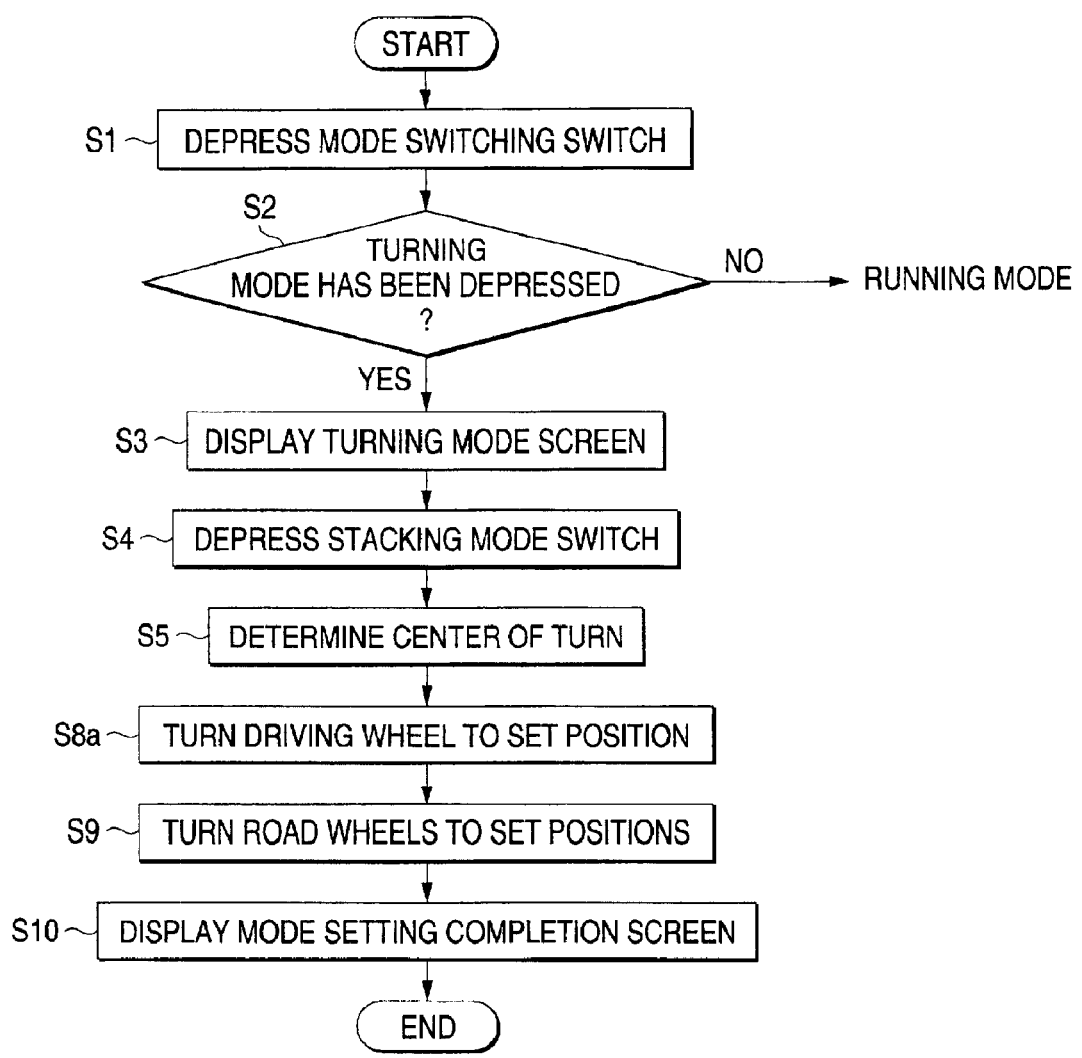
FIG. 28 is a flowchart associated with another embodiment of the invention.

Incidentally, while in the example shown in FIG. 21, after the center of turn is determined by depressing the stacking mode switch 28 the operator manually operates the steering wheel 4 in accordance with the steering wheel operation guide displayed in the display panel 14 so as to turn the driving wheel 8 to the predetermined angle, the series of operations can automatically be performed. FIG. 28 shows a flowchart for such an automatic operation, and like reference numerals are given to portions like to those described with reference to FIG. 21.

In FIG. 28, when the mode switching switch 20 on the display panel 14 is depressed (step S1), it is decided which switch has been depressed (step S2), and in the event that the turning mode switch 24 is depressed, the turning mode screen is displayed in the display panel 14 (step S3). When the stacking mode switch 28 is depressed (step S4), the controller 13 determines the center of turn (step S5). This series of operations is totally identical to that described while referring to FIG. 21.

Next, the driving wheel 8 is turned based on the center of turn so determined until the driving wheel 8 is oriented so as to follow along a circumference that would be formed about the point P (step S8a). Another steering motor (not shown) is provided in addition to the steering motor 9 for this purpose. Then, while monitoring the turning angle of the driving wheel 8 through the angle sensor 10, the controller 13 drives the steering motor, and the motor is stopped when the turning angle of the driving wheel reaches a set value.

Thereafter, similarly to the case described with reference to FIG. 21, the road wheels 5a, 5b are turned to the set positions (step S9) by means of the steering motors 6a, 6b, and after the turn of the road wheels is completed the mode setting completion screen shown in FIG. 20 is displayed in the information display part 25 (step S10).

According to the embodiment shown in FIG. 28, only by depressing the stacking mode switch 28 the driving wheel 8 and the road wheels 5a, 5b are automatically turned and the body 1 is set ready to turn about the point P, and therefore the load borne by the operator in operating the forklift truck 200 in this way can be reduced further.

Figure 29A:
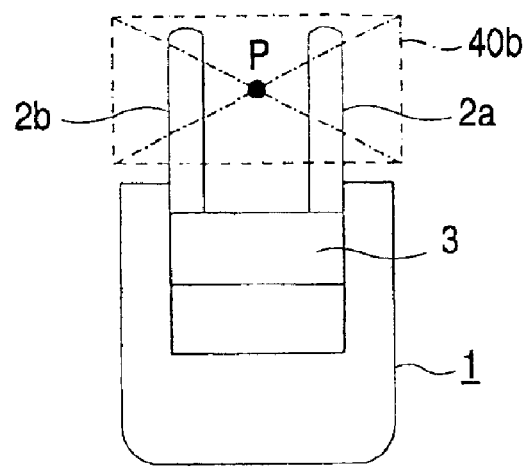
FIGS. 29A and 29B are diagrams explaining reach-out and reach-in of fork arms.
Figure 29B:
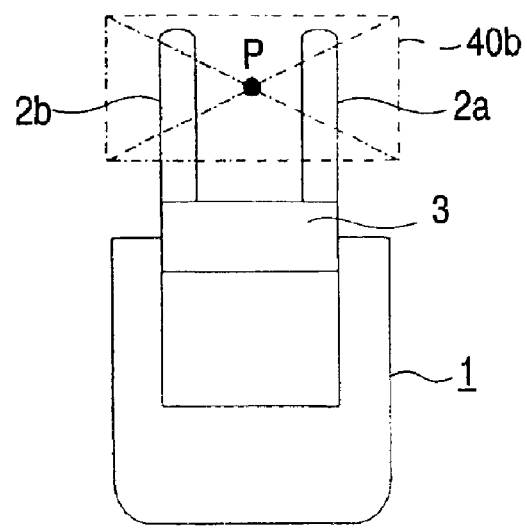

Incidentally, in a case where the forklift truck 200 is a reach forklift truck, since the fork arms 2a, 2b are provided in such a manner as to freely move in the longitudinal directions of the body 1, the position of the point P relative to the body varies to a reach-in condition shown in FIG. 29A and a reach-out condition shown in FIG. 29B, respectively. To cope with this, as a further embodiment of the invention, it can be contemplated that the center of turn is determined based on the position of the fork arms 2a, 2b which have been moved relative to the body 1.

In this case, the position of the fork arms 2a, 2b can be detected by the potentiometer 12 (FIGS. 2, 18) for detecting the position of the fork arms. To describe a specific constitution that can be contemplated therefor, for example, one end of a wire (not shown) is connected to a lower end of the mast 3, and the other end of the wire is taken up around a take-up reel (not shown) provided on the body 1, so that the number of times of turns of the take-up reel which turns in association with the movement of the mast is detected by the potentiometer 12. An encoder may be used as the fork arm a position detecting section instead of the potentiometer 12.

The controller 13 calculates a center of turn for the body 1 based on the position of the fork arms 2a, 2b so detected and sets the road wheels 5a, 5b and the driving wheel 8 such that they are oriented so as to follow circumferences that would be formed about the center of turn P. According to the construction, the center of turn can accurately be determined irrespective of the position of the fork arms 2a, 2b.

In addition, a device (for example, a potentiometer) detecting transverse positions of the fork arms may be provided for a forklift truck in which the two fork arms can be moved transversely in opposite directions so as to freely verify the space therebetween and a forklift truck in which the two fork arms can be moved in the same direction with the space between the fork arms being kept constant, and when the fork arms are moved transversely, outputs from the detecting device so provided are used as operation elements to suitably determine the center of turn.

Figure 25:
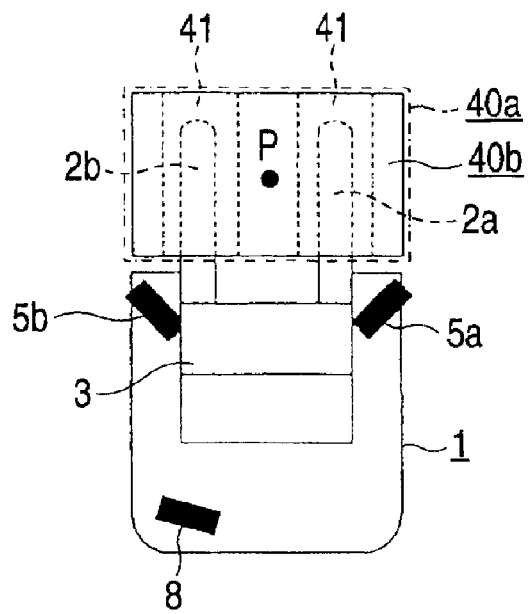
FIG. 25 is a diagram explaining a stacking operation.
Figure 26:
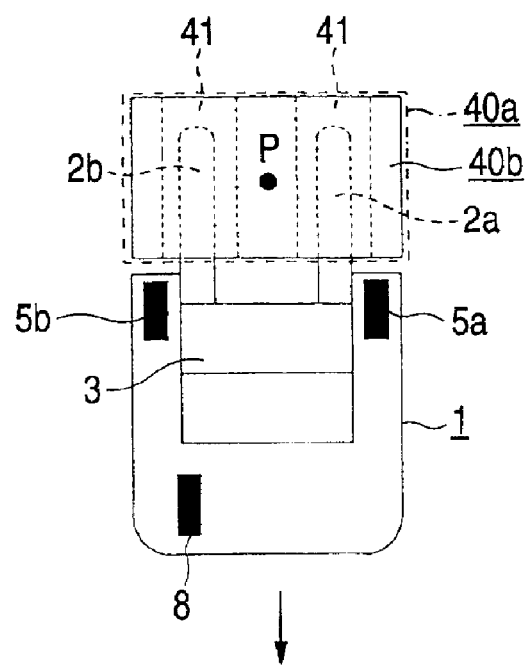
FIG. 26 is a diagram explaining another stacking operation.

Incidentally, after the body 1 has been set ready to turn, as has been described before, the running motor is driven to turn the body 1 and is then stopped when the body 1 has turned to a position where the pallet 40b overlaps the pallet 40a (FIG. 25). However, in a case where the forklift truck 200 is moved backward after the cargo has been unloaded, the body 1 has to be ready to move straight (FIG. 26). However, if the operator is being careless to fail to switch the operation mode from the turning mode back to the running mode, or if the operator starts to run the vehicle before the respective wheels have not been returned to the state in which the vehicle is ready to move straight even after he or she has switched the operation mode back to the running mode, there would be caused a risk of the body 1 being caused to turn or to start to move in an unexpected direction, resulting in an extremely dangerous situation.

To cope with this or to avoid the risk resulting in the dangerous situation, it is desirable to prohibit the body 1 from starting to run until the operation mode has been switched from the turning mode back to the running mode after the turn of the body has been completed and the wheels have been returned to the state where the body 1 is allowed to move straight.

Figure 30:
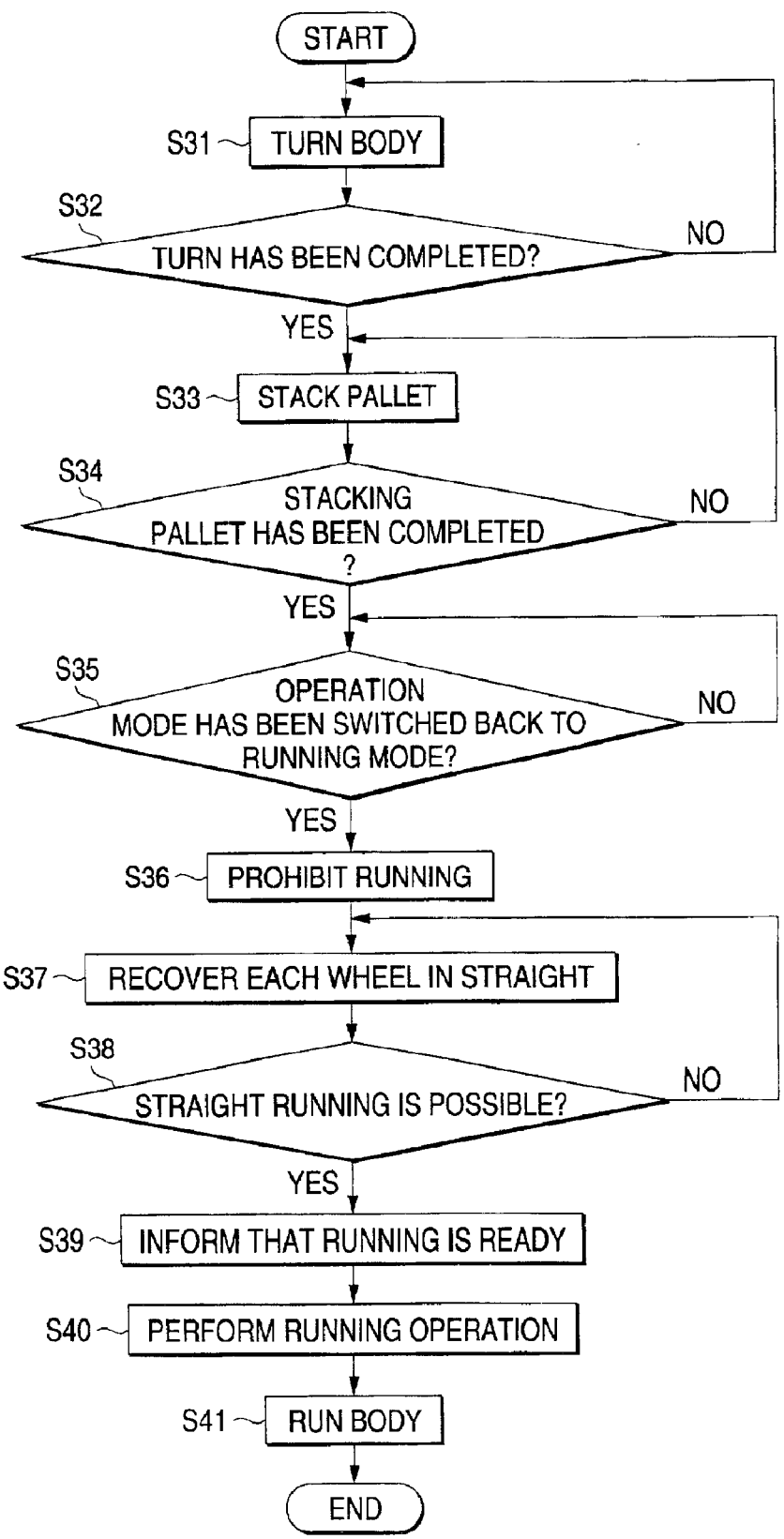
FIG. 30 is a flowchart associated with a further embodiment of the invention.
Figure 31A:
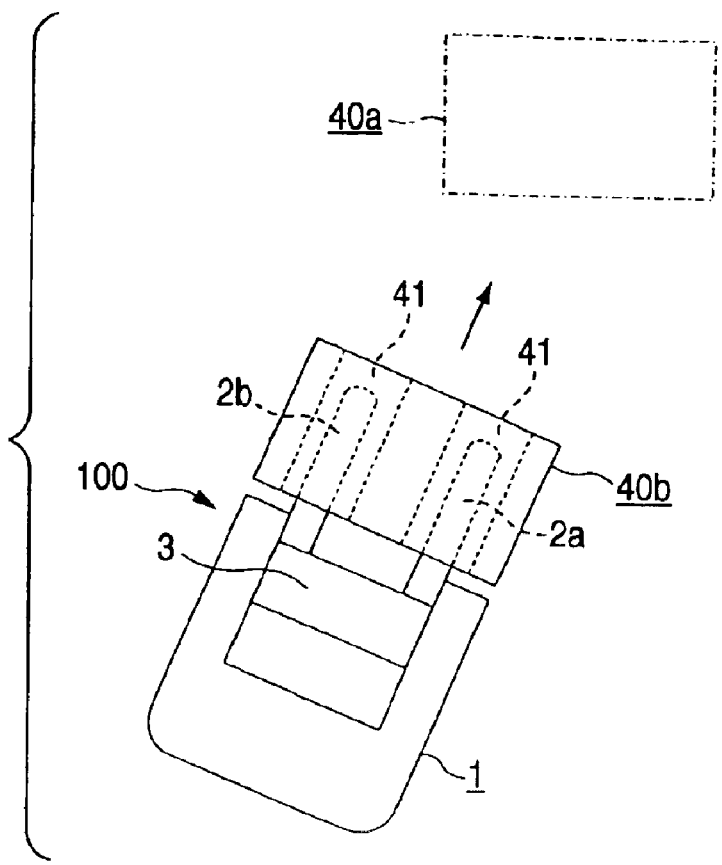
FIGS. 31A and 31B are diagrams explaining a stacking operation according to a conventional forklift truck.
Figure 31B:
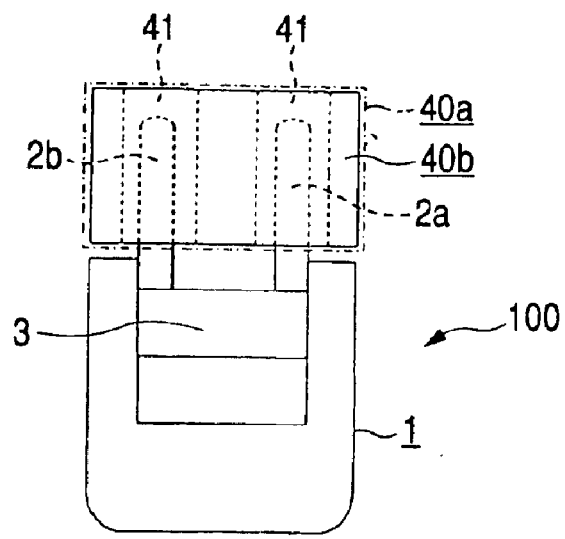

FIG. 30 is a flowchart showing a procedure for such a case. Firstly, the body 1 is turned (step S31), and when the turn is completed (step S32; YES), the fork arms 2a, 2b are lowered to perform a pallet stacking operation (step S33). when the stacking operation is completed (step S34; YES), whether or not the operation mode has been switched from the turning mode back to the running mode is determined (step S35). If the operation mode has not yet been switched back to the running mode, wait until the switching back of the operation mode is completed (step S35; NO), and if the operation mode is switched back to the running mode (step S35; YES), an electromagnetic brake of the running motor is activated so as to prohibit the body from running (step S36). Thereafter, the road wheels 5a, 5b and the driving wheel 8 are returned to the straight conditions shown in FIG. 26 (in which the turning angles thereof are zero) (step S37).

When the respective wheels are returned to the straight conditions, the body 1 gets ready to move straight (step S38; YES), and at this point in time the information device (FIG. 18) informs the operator that the forklift truck 200 gets ready to run (step S39). This information device is constituted by, for example, a buzzer and even if a running operation is carried out before the buzzer is activated, the body 1 does not start. When the operator carries out a rearward running operation upon hearing the sound of the buzzer activated (step S40), the body 1 starts to move straight rearward (step S41). Note that a chime may be used for the information device 22 instead of the buzzer. In addition, instead of or in addition to the information by sound using the information device 22, a message informing that running is permitted may be displayed on the display panel 14. As this occurs, the display panel 14 constitutes an information section according to the invention.

Thus, according to the embodiment shown in FIG. 30, since the operation mode is switched back to the running mode after the turn of the body is completed (step S35) and the body 1 is allowed to run on condition that the respective wheels are returned to the condition in which the straight running is permitted (step S38), the safety is ensured by preventing the body 1 from being caused to turn or to start to run in an unexpected direction due to carelessness of the operator. In addition, since the information is given by sound or display that the forklift truck gets ready to run, the operator is allowed to perform the running operation in a smooth fashion.

While the fork arms have been described as in the case where two fork arms are used in the above embodiments, the invention may be applied to a cargo handling vehicle employing three or more fork arms.

According to the invention, since the body can easily be positioned relative to the cargo or pallet by turning the body about the distal end or ends of the cargo carrier table or tables, even beginners can carry out unloading operations efficiently within a short period of time.

According to the invention, since the body can easily be turned about the longitudinally and transversely central portion of the cargo carrier tables, even beginners can carry out operations of stacking a pallet carried on the cargo carrier tables on a pallet stacked efficiently within a short period of time.

What is claimed is:

1. A forklift comprising:
   a body;
   a wheel disposed to the body;
   a plurality of fork arms attached to an front end of the body for carrying cargo; and
   a mode switching section for switching over modes of operation between a normal running mode and a turning mode in which the body is turnable,
   wherein the turning mode adapts the body to be turned about a center of turn specifically identified to be at or within a predetermined distance from one or more of the distal ends of the fork arms.

2. The forklift as set forth in claim 1, wherein the fork arms are provided left and right at the front of the body; and
   the body is adapted to be turned about a distal end of either of the left and right fork arms as the center of turn.

3. The forklift as set forth in claim 2, wherein the distal end of the left fork is set as a center of turn when the steering wheel is turned counterclockwise in the turning mode; and
   the distal end of the right fork is set as a center of turn when the steering wheel is turned clockwise.

4. The forklift as set forth in claim 1, wherein the fork arms are provided left and right at the front of the body; and
   the body is adapted to be turned about, as the center of turn, substantially a central portion of a line connecting distal ends of the fork arms with each other.

5. The forklift as set forth in claim 1, wherein the fork arms are provided left and right at the front of the body; and
   the body is adapted to be turned about as the center of turn a position a predetermined distance frontward from the distal end of each of the fork arms.

6. The forklift as set forth in claim 1, further comprising a center-of-turn selecting section for selecting a desired center of turn from a plurality of centers of turn.

7. The forklift as set forth in claim 6, wherein the wheel is set at a predetermined angle according to an operation of a steering wheel when the center-of-turn selecting section selects a center of turn so that the body is turned about the center of turn selected.

8. The forklift as set forth in claim 6, wherein the wheel is automatically set at a predetermined angle when the center-of-turn selecting section selects a center of turn so that the body is turned about the center of turn so selected.

9. The forklift as set forth in claim 1, wherein the fork arms are provided movably in longitudinal directions of the body,
   the forklift further comprising a position detecting section for detecting a position to which the fork arms are moved relative to the body; and a center-of-turn position calculating section for calculating a center of turn of the body based on the position of the fork arms detected by the position detecting section.

10. The forklift as set forth in claim 1, wherein the mode of the cargo handling vehicle is switched over from the turning mode to the normal running mode when the turn of the body is completed and the body is prohibited from running until the wheels are restored to a condition in which the body is allowed to move straight.

11. The forklift as set forth in claim 10, further comprising an information section for informing that the body is ready to run when the condition is restored in which the body is allowed to move straight.

12. A forklift comprising:
    a body;
    a wheel disposed to the body;
    a plurality of fork arms attached to a front end of the body for carrying cargo; and
    a mode switching section for switching modes of operation between a normal running mode and a turning mode in which the body is turnable,
    wherein the turning mode adapts the body to be turned about substantially a longitudinally and transversely central portion of the fork arms as a center of turn.

13. The forklift as set forth in claim 12, wherein the wheel is set at a predetermined angle according to an operation of a steering wheel so that the body turns about the center of turn.

14. The forklift as set forth in claim 12, wherein the wheel is automatically set to a predetermined angle so that the body turns about the center of turn.

15. The forklift as set forth in claim 12, wherein the fork arms are provided in such a manner as to freely extend in longitudinal directions of the body,
    the forklift further comprising:
    a position detecting section for detecting a position to which the fork arms are moved relative to the body; and
    a center-of-turn position calculating section for calculating a center-of-turn position of for the body based on the position of the fork arms detected by the position detecting section.

16. The forklift as claimed in claim 12, wherein the mode of the cargo handling vehicle is switched over from the turning mode to the normal running mode when the turn of the body is completed and the body is prohibited from running until the wheel is restored to a condition in which the body is allowed to move straight.

17. The forklift as set forth in claim 16, further comprising an information section for informing that the body is ready to run when the condition is restored in which the body is allowed to move straight.

18. A cargo handling vehicle comprising:
    a body;
    a wheel disposed to the body;
    a mode switching section for switching over modes of operation between a normal running mode and a turning mode in which the body is turnable; and
    a center-of-turn selecting section for selecting a desired center of turn out of a plurality of centers of turn in the turning mode,
    wherein the body is adapted to turn about a center of turn selected by the center-of-turn selecting section as a center of the turn.

* * * * *